(12) United States Patent
Venkateshwaran et al.

(10) Patent No.: US 12,493,747 B2
(45) Date of Patent: Dec. 9, 2025

(54) COMPUTERIZED NATURAL LANGUAGE PROCESSING WITH WORKFLOW RECOMMENDATIONS USING SEMANTIC ANALYSIS

(71) Applicant: Charlee.ai, Inc., Pleasanton, CA (US)

(72) Inventors: Ramaswamy Venkateshwaran, San Ramon, CA (US); Sri Ramaswamy, San Ramon, CA (US); John Standish, Menefee, CA (US); Tim Evans, Concord, CA (US)

(73) Assignee: Charlee.ai, Inc., Pleasanton, CA (US)

( * ) Notice: Subject to any disclaimer, the term of this patent is extended or adjusted under 35 U.S.C. 154(b) by 718 days.

(21) Appl. No.: 17/736,423

(22) Filed: May 4, 2022

(65) Prior Publication Data

US 2023/0117206 A1 Apr. 20, 2023

Related U.S. Application Data

(63) Continuation-in-part of application No. 16/798,277, filed on Feb. 21, 2020, now Pat. No. 11,604,926.

(60) Provisional application No. 62/808,302, filed on Feb. 21, 2019.

(51) Int. Cl.
*G06F 40/30* (2020.01)
*G06F 40/242* (2020.01)
*G06N 5/04* (2023.01)

(52) U.S. Cl.
CPC ............ *G06F 40/30* (2020.01); *G06F 40/242* (2020.01); *G06N 5/04* (2013.01)

(58) Field of Classification Search
CPC ...... G06F 40/30; G06F 40/242; G06F 16/367; G06F 40/131; G06F 40/216; G06F 40/247; G06F 40/289; G06N 5/04; G06N 3/044; G06N 3/092; G06N 20/10; G06Q 10/10; G06Q 40/08
USPC .......................................................... 704/9
See application file for complete search history.

(56) References Cited

U.S. PATENT DOCUMENTS

2018/0165723 A1* 6/2018 Wright ..................... G06F 40/30

* cited by examiner

*Primary Examiner* — Thierry L Pham

(57) ABSTRACT

A computerized method for extracting domain specific insights from a corpus of files containing large documents comprising: breaking down large chunks of text into smaller sentences/short paragraphs in a domain specific way, identifying and removing domain noise; identifying the sentence intents of the non-noise sentences; tagging the sentences with other domain specific attributes; defining a semantic ontology using a graph database based on the sentence intents, a multitude of mini-dictionaries and domain attributes; applying a pre-defined ontology to tag documents with domain specific hashtags; and combining the hashtags using machine learning techniques into insights.

11 Claims, 24 Drawing Sheets

COMPUTERIZED NATURAL LANGUAGE PROCESSING WITH WORKFLOW RECOMMENDATIONS USING SEMANTIC ANALYSIS

CROSS-REFERENCE TO RELATED APPLICATIONS

This claims is a continuation in part of U.S. patent application Ser. No. 16/798,277 filed on Feb. 21, 2020 and titled METHOD AND SYSTEM OF CREATING AND SUMMARIZING UNSTRUCTURED NATURAL LANGUAGE SENTENCE CLUSTERS FOR EFFICIENT TAGGING, now U.S. Pat. No. 11,604,926, issued Mar. 14, 2023. These patent documents are hereby incorporated by reference in their entirety.

U.S. patent application Ser. No. 16/798,277 claims priority to U.S. Patent Provisional Application No. 62/808,302, titled METHOD AND SYSTEM OF AN AUTOMATED ASSISTANT FOR INSURANCE CLAIMS INVESTIGATION AND RED FLAGGING and filed on 21 Feb. 2019. This provisional application is hereby incorporated by reference in its entirety.

FIELD OF THE INVENTION

The invention is in the field of natural language processing and more specifically to a method, system, and apparatus for computerized natural language processing with insights extraction using semantic search.

DESCRIPTION OF THE RELATED ART

In Natural Language Processing (NLP), systems may process a large chunk of unstructured text and accurately identify various topics, events, and nuances in the data. Sometimes these events may only be mentioned briefly in the text and may only appear in a minority of documents in the corpus, but they bear a lot of significance towards the final outcome. For example, in insurance claim processing, a lot of data is unstructured text such as claim notes and documents. Claim notes may span tens to hundreds of pages each. Some of these claims may have medical specialists, such as an orthopedic surgeon, involved. Only a minority (around 15%) of the claim may have an orthopedic surgeon involved, but those claims often end up with higher severity than the other claims. In claims where an orthopedic surgeon is involved, it may only be mentioned once or twice in the entire claim notes.

In insurance claims processing, only a minority of claims (e.g. 12-20%) have emotions going sour, where the claimant threatens to seek an attorney. However, claims that go into litigation end up being the most expensive, and claims where there is a threat to seek an attorney need immediate attention to prevent litigation. When a claimant threatens to seek an attorney, it may only be noted once in the claim files.

At the same time, the corpus may contain repetitive occurrences of certain text which may be mistaken to indicate the presence of an event but doesn't actually do so. When extracting the topics/event using NLP, it is critical to ensure that such text does not lead to false positives. For example, in insurance claim notes, there may be cut and paste of boiler plate language or a template such as "Claimant threatens to seek attorney? Yes/No". This language may only be present in certain claims, and we need to ensure that such claims are not falsely identified as the claimant threatening to seek an attorney. Falsely identifying such claims may result in unnecessary escalations and increasing the workload of the claims examiner/manager, thereby adding to the expenses.

The above problem is compounded by the fact that the text may not follow typical rules of grammar. Also, different documents within the corpus may follow different rules of grammar. Additionally, the same text may also appear in different nuances which needs to be carefully identified to avoid false positives or false negatives. For example, in the above insurance claims example, claims examiner may use shorthand notion such as "Clmt threats atty—no", "no clmt atty threat", etc. Different claim notes may have variations of similar looking text, but with very different connotations, such as "Claimant threatens attorney? No", "Claimant threatens attorney? Yes", "If claimant threatens attorney Escalate", "Claimant not threatens attorney", etc. The above nuances make extracting topics and events a non-trivial task. Extracting insights accurately from unstructured claims data is critical to use cases such as litigation prediction, severity prediction, and several other use cases.

Topic extraction techniques such as Latent Dirichlet Allocation (LDA) focus on extracting topics where the keywords identifying the topics are found multiple times in a text and are found in a majority of the documents in the corpus. For example, if a large majority of insurance claims in the database have a threat of the claimant seeking an attorney, and the threat is mentioned multiple times in each document, such techniques would identify "claimant attorney threat" as a significant topic. However, for the problem statement given above, such techniques would miss identifying "claimant attorney threat" as a topic. Keyword and phrase search techniques could end up with a lot of false positives due to template/boiler plate text; or they could end up with a lot of false negatives as they don't do a semantic interpretation of the text.

Keyword and phrase search techniques may also end up with false positives due to the same word meaning different things in different contexts. For example, in the sentence "she had a sprain", sprain refers to a physical injury; whereas in the sentence "the shingles were sprained", the same word sprain refers to a roof damage. Keyword searches don't differentiate between these contexts. Keyword search also cannot differentiate between "she had a sprain" and "she had no sprain". Machine learning based classifier models trained on the complete text are subject to a lot of noise in the data, which makes training them difficult. It also is very time consuming to train such models.

Named Entity Recognition (NER) based approaches can have a lot of noise in the extraction due to imperfect grammar in the text. Techniques such as BIO tagging are very time-consuming and subject to overfitting due to the sparse nature of the topics/events in the text. Today's state of the art techniques fall short in solving the above problem and hence a new invention is needed.

SUMMARY OF THE INVENTION

A computerized method for extracting domain specific insights from a corpus of files containing large documents comprising: breaking down large chunks of text into smaller sentences/short paragraphs in a domain specific way, identifying and removing domain noise; identifying the sentence intents of the non-noise sentences; tagging the sentences with other domain specific attributes; defining a semantic ontology using a graph database based on the sentence intents, a multitude of mini-dictionaries and domain attributes; applying a pre-defined ontology to tag documents with domain specific hashtags; and combining the hashtags using machine learning techniques into insights.

Figure 1:
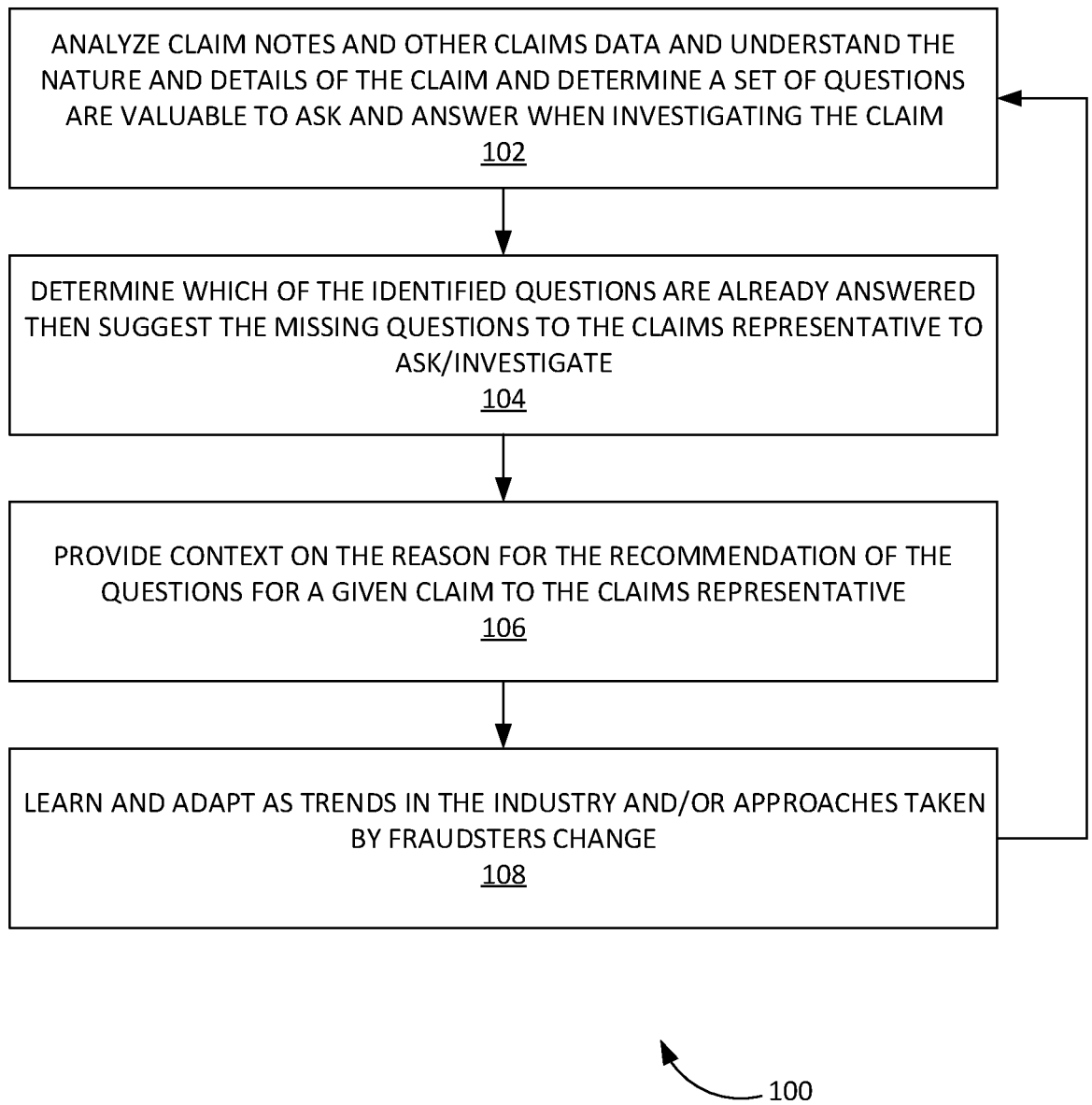
FIG. 1 illustrates an example process for using an AI assistant/bot in the FNOL phase of an automated insurance claim analysis, according to some embodiments.

The Figures described above are a representative set and are not an exhaustive with respect to embodying the invention.

DESCRIPTION

Disclosed are a system, method, and article of manufacture for extracting domain specific insights from a corpus of files containing large documents, where the insights may be related to small snippets of the documents. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

APACHE SOLR is an open-source enterprise search platform, written in JAVA, from the APACHE LUCENE project. It includes full-text search, hit highlighting, faceted search, real-time indexing, dynamic clustering, database integration, NoSQL features and rich document (e.g., Word, PDF) handling.

Automated assistant can be a software agent that can perform tasks, or services, on behalf of an individual based on a combination of user input, location awareness, and the ability to access information from a variety of online sources.

Bag-of-words model is a simplifying representation used in natural language processing and information retrieval (IR). In this model, a text (such as a sentence or a document) is represented as the bag (multiset) of its words, disregarding grammar and even word order but keeping multiplicity.

Deep learning is part of a broader family of machine learning methods based on learning data representations, as opposed to task-specific algorithms. Deep learning can be supervised, semi-supervised or unsupervised.

Elasticsearch is a search engine based on the Lucene library. Elasticsearch provides a distributed, multitenant-capable full-text search engine with an HTTP web interface and schema-free JSON documents.

First Notice of Loss (FNOL) can the initial report made to an insurance provider following a loss, theft and/or damage of an insured asset. The FNOL can be an early step in a formal claims process lifecycle.

Gradient boosting (GBM) is a machine learning technique for regression and classification problems, which produces a prediction model in the form of an ensemble of weak prediction models, typically decision trees. GBM builds the model in a stage-wise fashion like other boosting methods do, and it generalizes them by allowing optimization of an arbitrary differentiable loss function.

Graph database (GDB) is a database that uses graph structures for semantic queries with nodes, edges, and properties to represent and store data. [1] A key concept of the system is the graph (e.g. or edge or relationship). The graph relates the data items in the store to a collection of nodes and edges, the edges representing the relationships between the nodes. The relationships allow data in the store to be linked together directly and, in many cases, retrieved with one operation. Graph databases hold the relationships between data as a priority. Querying relationships is fast because they are perpetually stored in the database. Relationships can be intuitively visualized using graph databases, making them useful for heavily inter-connected data.

K-means clustering is a method of vector quantization that can be used for cluster analysis in data mining. K-means clustering can partition n observations into k clusters in which each observation belongs to the cluster with the nearest mean, serving as a prototype of the cluster.

MapReduce is a programming model and an associated implementation for processing and generating big data sets with a parallel, distributed algorithm on a cluster.

N-gram is a contiguous sequence of n items from a given sample of text or speech. The items can be phonemes, syllables, letters, words, or base pairs according to the application. The n-grams typically are collected from a text or speech corpus.

Ontology encompasses a representation, formal naming, and definition of the categories, properties, and relations between the concepts, data, and entities that substantiate one, many, or all domains of discourse. An ontology can be a way of showing the properties of a subject area and how they are related, by defining a set of concepts and categories that represent the subject.

Principal component analysis (PCA) is a statistical procedure that uses an orthogonal transformation to convert a set of observations of possibly correlated variables into a set of values of linearly uncorrelated variables called principal components.

Reinforcement learning (RL) is an area of machine learning concerned with how software agents ought to take actions in an environment so as to maximize some notion of cumulative reward.

Recurrent neural network (RNN) is a class of artificial neural network where connections between nodes form a directed graph along a sequence.

Regular expression is a sequence of characters that define a search pattern.

Sentence boundary disambiguation (SBD), also known as sentence breaking, sentence boundary detection, and sentence segmentation, is the problem in natural language processing of deciding where sentences begin and end. Natural language processing tools often require their input to be divided into sentences.

Supervised learning is the machine learning task of learning a function that maps an input to an output based on example input-output pairs. It infers a function from labeled training data consisting of a set of training examples. In supervised learning, each example is a pair consisting of an input object (e.g. a vector) and a desired output value (e.g. a supervisory signal). A supervised learning algorithm analyzes the training data and produces an inferred function, which can be used for mapping new examples.

Support-vector machines (SVMs) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

Taxonomy is the practice and science of categorization or classification. A taxonomy (e.g. a taxonomical classification) can be a scheme of classification (e.g. a hierarchical classification, etc.) in which things are organized into groups or types. A taxonomy can be used to organize and index knowledge (e.g. stored as documents, articles, videos, etc.).

TF-IDF (term frequency-inverse document frequency) is a numerical statistic that is intended to reflect how important a word is to a document in a collection or corpus. TF-IDF can be used as a weighting factor in searches of information retrieval, text mining, and user modeling. The TF-IDF value increases proportionally to the number of times a word appears in the document and is offset by the number of documents in the corpus that contain the word, which helps to adjust for the fact that some words appear more frequently in general.

Unsupervised learning is a branch of machine learning that learns from test data that has not been labeled, classified, or categorized. Instead of responding to feedback, unsupervised learning identifies commonalities in the data and reacts based on the presence or absence of such commonalities in each new piece of data.

Virtual assistant (e.g. a "chatbot") can be a software agent that can perform tasks or services for an individual. Virtual assistant can be accessed by online chat channels, an application interface, and the like. A virtual assistant can interpret human speech and respond (e.g. via text, synthesized voice, etc.).

Word2vec is a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located close to one another in the space.

EXAMPLE METHODS

FIG. 1 illustrates an example process for using an AI assistant/bot in the FNOL phase of an automated insurance claim analysis, according to some embodiments. AI assistant/bot addresses the FNOL phase of an insurance claim. In the FNOL phase of an insurance claim, various information about the claim is gathered in order to further investigate said insurance claim. The claims adjuster tracks and is to be notified of various alerts related to the insurance claim. This is one example use case of a natural language processing (NLP) based computing system that provides insights and recommendations from unstructured data.

It is noted that insurance-claims representatives may handle a variety of claims and ask various questions in order to investigate, in order to determine whether a claims is genuine or not. There is no standardized question set and process across the insurance industry. At various times, due to their inexperience, claims representatives may miss asking correct questions. These misses may cause costly lapses in the process. This can lead to insufficient documentation which can later be contested in court if the insurance company were to deny the claim. This scenario can also lead to fraud/misrepresentation going undetected and such claims may be paid, increasing claim costs.

Process 100 can provide a distributed database. More specifically, in step 102, process 100 can analyze claim notes and other claims data and understand the nature and details of the claim and determine a set of questions are valuable to ask and answer when investigating the claim. The claims file may include large amounts of unstructured data. In step 104, process 100 can determine which of the identified questions are already answered then suggest the missing questions to the claims representative to ask/investigate. In step 106, process 100 can provide context on the reason for the recommendation of the questions for a given claim to the claims representative. In step 108, process 100 can learn and adapt as trends in the industry and/or approaches taken by fraudsters change.

Figure 2:
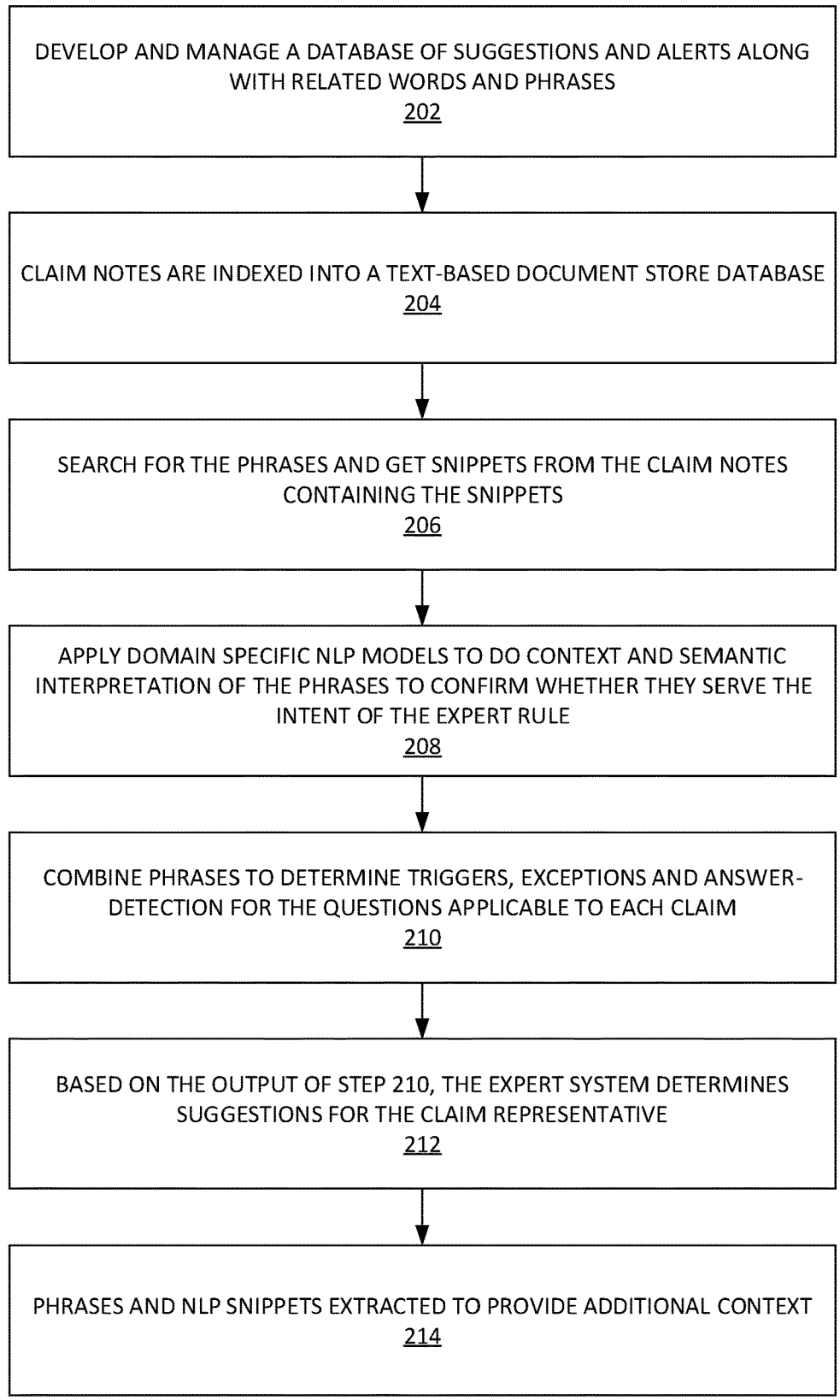
FIG. 2 illustrates an example process for implementing an expert system, according to some embodiments.

FIG. 2 illustrates an example process 200 for implementing an expert system, according to some embodiments. Process 200 can be used to implement suggestions, alerts and/or context extraction. Process 200 can be implemented with an expert system.

In step 202, process 200 can provide a database of suggestions and alerts along with related words and phrases are drafted based on expert experience and configured in an expert system database. For each question, the expert system can be configured with the lines of businesses (LOBs) that the question applies to NLP-based triggers on when to ask the question. Process 200 can provide NLP-based exceptions on when not to ask the question. Process 200 can provide NLP-based rules on how to detect if the question has already been asked/answered.

In step 204, the claim notes are indexed into a text-based document store database (e.g. SOLR or ELASTICSEARCH). As the data is loaded, it is manipulated in specified ways that can include, inter alia: stemming, stop-words filtering with a domain-specific stop-word list, term expansion based on a domain-specific dictionary, etc. In step 206, process 200 can search for the phrases and obtain snippets from the claim notes containing the snippets. In step 208, process 200 can apply domain specific NLP models to do context and semantic interpretation of the phrases to confirm whether they serve the intent of the expert rule. In one example, only phrases that align with the intent are kept and others are discarded. Process 200 can implement techniques such as, inter alia: regular-expression, word-vectorization, topic extraction, etc.

In step 210, process 200 can combine phrases to determine triggers, exceptions, and answer-detection for the questions applicable to each claim. Process 200 can implement AND/OR rules based on expert knowledge. Process 200 can implement NLP analysis rules. Process 200 can implement a scoring and statistical modeling.

In step 212, based on the outputs of the previous steps, the expert system provides suggestions for the claim. In step, 214, process 200 provides phrases and NLP snippets extracted help provide context. Additionally, in some examples, a separate context extractor is also used to tune the context.

Machine-Learning

Systems/processes 300-1400 can include machine-learning modules. In various examples, machine-learning can include a combination of supervised, unsupervised and reinforcement machine-learning techniques that can used to obtain various suggestions.

In supervised learning a corpus of claim notes and other claim documents at the FNOL stage can be first converted to text using optical character recognition (OCR) techniques. The corpus of claim notes and other claim documents can be appended to the structured data for the claim. The corpus of claim notes and other claim documents can then be annotated or tagged by the experts with a list of suggestions and alerts for each claim. The expert also annotates each suggestion with context keywords and phrases for that suggestion. It is noted that various transformations can be performed on the claim documents text and annotations, such as, inter alia: stemming, join-word merging, stop-word filtering, synonym-extraction and filtering, bag of words conversion, etc. Each annotated claim document can be converted to a string of tokens. Further transformations, such as word-vectorization, can be performed on these tokens to convert the document to a time series of vectors or tensors. This vector/tensor time series (along with claims structured data) can then be used as input to machine learning.

Machine-learning models (such as, inter alia: deep learning RNN, SVM, GBM, etc.) can be trained with the annotated data to be able to predict suggestions, along with their context, based on claim notes at FNOL stage. Additionally, a machine-learning model can be instrumented to provide context data as one of the outputs. Accordingly, the machine-learning models can be tweaked to learn and provide context information along with suggestions. In addition, an expert system-based context extractor can be used to tune the context.

Unsupervised learning methods are now provided. Various unsupervised learning techniques can be utilized. Example unsupervised learning techniques can include, inter alia: clustering, topic extraction and frequent pattern mining and combinations thereof can be used to extract features and rules, and cluster similar claims together.

Claim notes and other claim documents can be first converted to text using OCR. Various transformations are performed on the resulting text, such as, inter alia: stemming, join-word merging, stop-word filtering, synonym-extraction and filtering, and bag of words conversion. These transformations convert each claim document to a string of tokens. The string of tokens are then indexed to create dictionaries for various key concepts to be learned. Further transformation(s), such as word-vectorization can be performed on these tokens to convert the document to a time series of vectors or tensors. The vector/tensor time series, along with claims structured data is used as input to machine learning.

The unsupervised learning techniques learn patterns of what follow-up phrases and suggestions can be provided for various claims at the FNOL stage. The unsupervised learning techniques can also learn dictionaries of key concepts as well as synonyms. The unsupervised learning techniques can also learn nuances of various claims adjusters and similarities and differences between them. Tuning weights are used to either bias or un-bias the learnings and suggestions, as appropriate.

Reinforcement Learning can also be utilized. An end-user feedback loop in implemented in the user interface, using which the end user (claims adjuster/supervisor) can provide feedback on the suggestions provided by expert system, supervised or unsupervised machine learning. The user can provide a positive or negative feedback. Reinforcement learning learns patterns of when the users provided positive versus negative feedback, and accordingly tunes the system to provide more meaningful and targeted suggestions. Reinforcement learning can be used as a layer on top of expert system and other machine-learning to fine tune the suggestions and remove noise. It can add 'good' bias towards the customer's business process.

Additionally, machine-learning feeds back into the expert system to refine the NLP models and enhance expert system rules. Multiple processes can be run in parallel (e.g. map-reduce techniques) to speed up processing time.

FIGS. 3-6 illustrate example systems 300-600 for generating suggestions, alerts, and context extraction in an insurance claims context, according to some embodiments.

Figure 3:
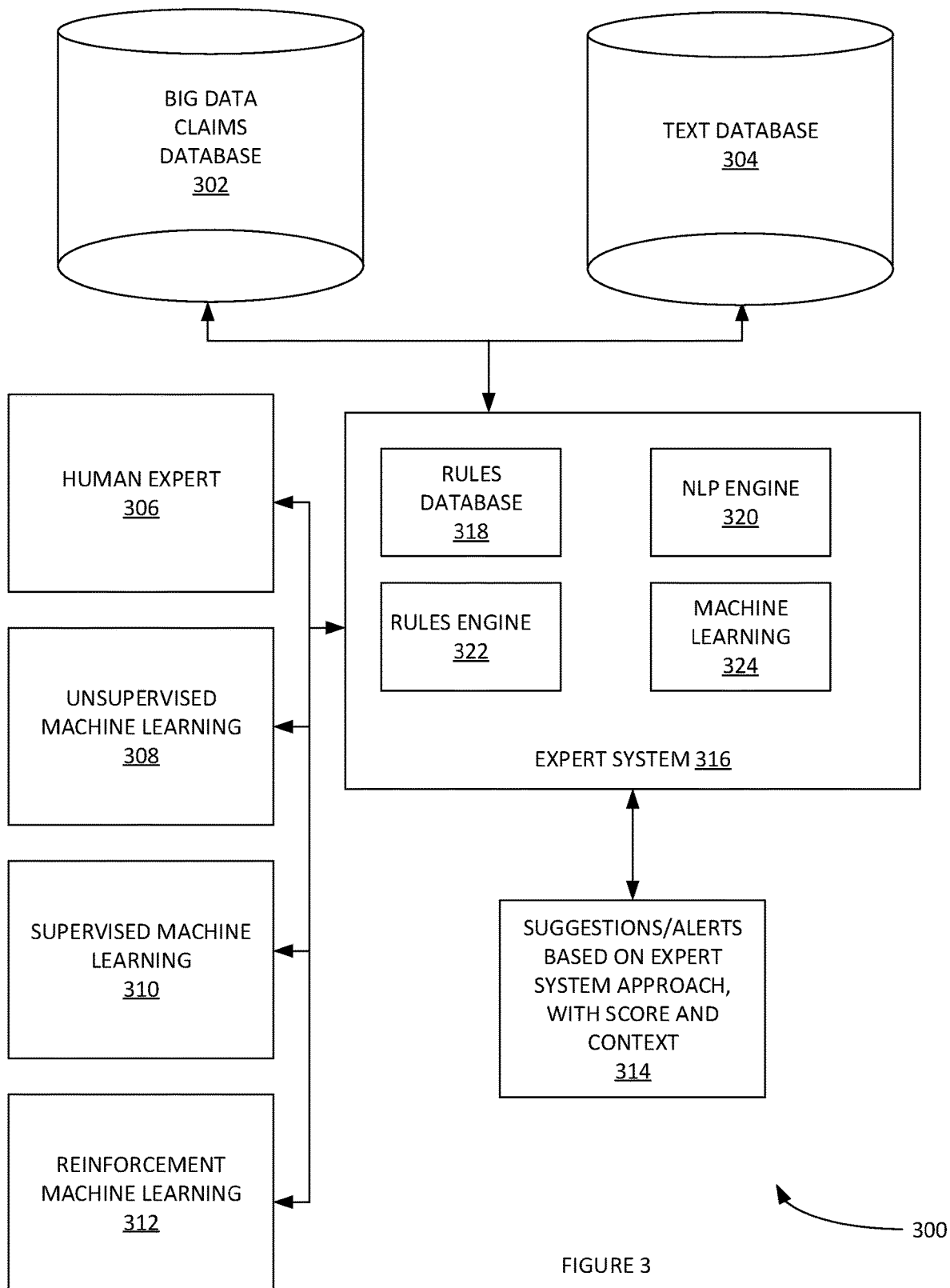
FIG. 3 illustrates an example system for generating suggestions/alerts based on expert system approach, with score and context, according to some embodiments.

FIG. 3 illustrates an example system 300 for generating suggestions/alerts based on expert system approach, with score and context, according to some embodiments. System 300 can include a big data claims database 302 (e.g. an HBASE). Big data claims database 302 can include both structured data unstructured data claim notes other documents. System 300 can include a text database 304 (e.g. SOLR/ELASTICSEARCH). Text database 304 can include, inter alia: stop-word filtering; synonym filtering; stemming; indexing. System 300 can utilize a human expert 306. Human expert 306 can implement various actions, including, inter alia: configure words/phrases, NLP models for claim signature detection, etc. System 300 can utilize an unsupervised machine-learning module 308. The unsupervised machine-learning module 308 can learn new words/phrases; learn new claim patterns, questions; etc. System 300 can utilize supervised machine-learning module 310. Supervised machine-learning module 310 can: refine words/phrases, implement NLP models, provide claim-patterns questions, etc. System 300 can reinforcement machine-learning module 312. Reinforcement machine-learning module 312 can: refine words/phrases, implement NLP models, determine claim patterns questions, etc.

An expert system 316 can be provided. Suggestions/alerts can be based on expert system approach, with score and context. Expert system 316 can be configure: rules, triggers, exceptions and answers for suggestions and alerts. Expert system 316 can search for words/phrases (expert-configured and learned) in claim notes and NLP-based semantic context-detection for claim signature detection. Expert system 316 can combine phrases into triggers and exceptions, score where appropriate and detect patterns combining events, structured data, and time series. Expert system 316 can recommend claim-specific suggestions and alerts based on patterns. Expert system 316 can prioritize suggestions and alerts for recommendation. Expert system 316 can include a rules database 318, an NLP engine 320, a rules engine 322 and a machine-learning engine 324. Expert system 316 can generate suggestions/alerts based on expert system approach, with score and context 314.

Figure 4:
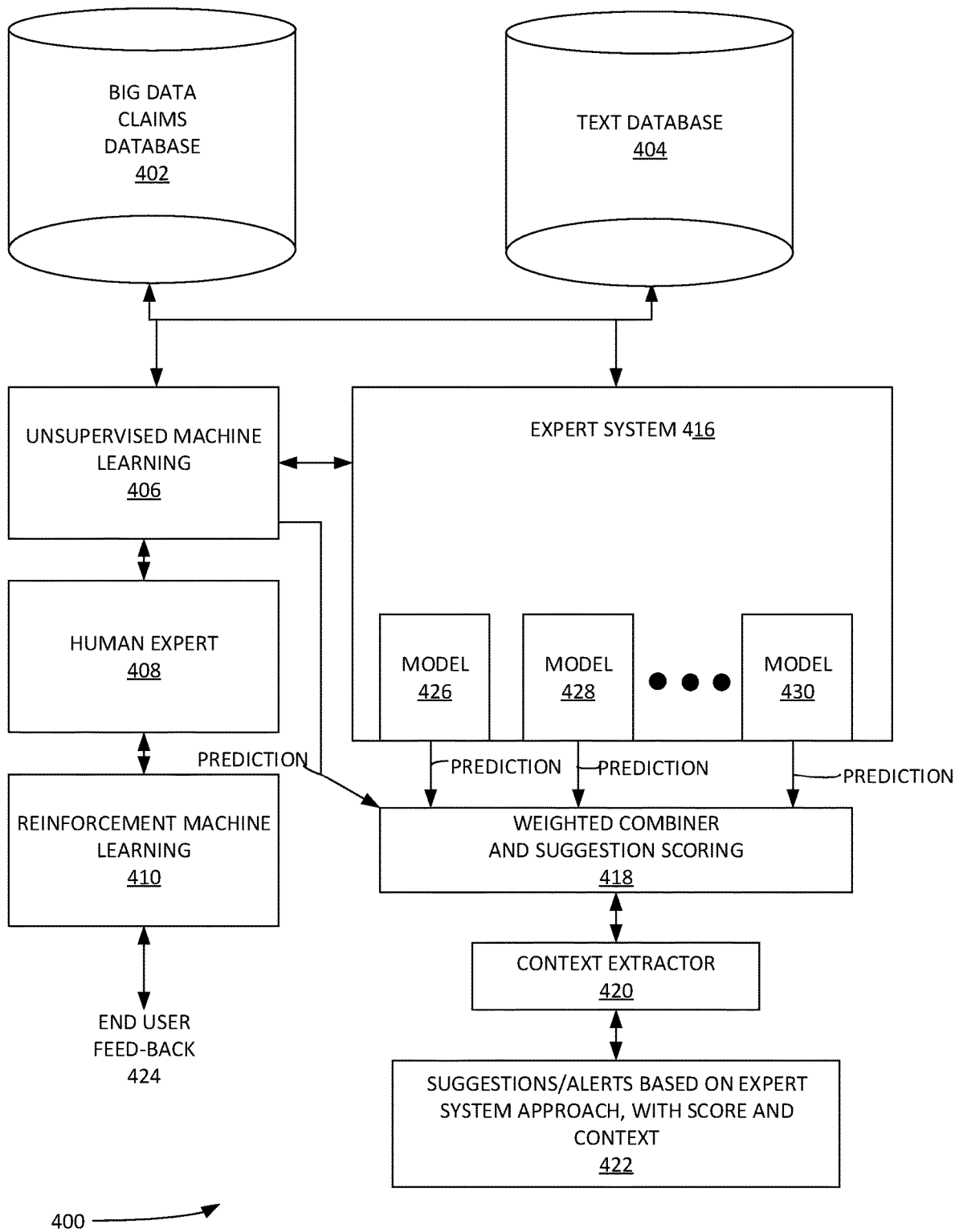
FIG. 4 illustrates an example system for recommended suggestions/alerts based on NLP machine-learning approach, with score and context, according to some embodiments.

FIG. 4 illustrates an example system 400 for recommended suggestions/alerts based on NLP machine-learning approach, with score and context, according to some embodiments. System 400 includes a big data claims database (e.g. HBASE) 402. Big data claims database 402 includes both structured data and unstructured data of claim notes other documents. System 400 includes time series vectors/tensors 404. Time series vectors/tensors 404 can include, inter alia: stop-word/join-word filtering; synonym expansion; stemming; bag of words transform; word-vectorization; etc. System 400 includes unsupervised machine-learning module 406. Unsupervised machine-learning module 406 implements various operations, such as, inter alia: clustering; topic extraction; frequent pattern mining identify patterns and anomalies; learn concept dictionaries; etc. Human experts 408 can implement weights tuning for the models, etc.

System 400 includes supervised machine-learning module 416. Supervised machine-learning module 408 implements various operations, such as, multiple machine-learning models based on structured/unstructured data. Each model scores suggestions/alerts, uses human expert data, and provides weights tuning.

System 400 includes reinforcement machine-learning module 410. Reinforcement machine-learning module 410 refines words/phrases to use for machine-learning and their weights. An expert system provides models 416-430 that implement a weighted combiner and suggestion scoring module 418. Context extractor 420 then extracts content such as, top phrases used in prediction, topic extraction using NLP, etc. System 400 generates the recommended suggestions/alerts based on NLP machine-learning approach, with score and context 422.

Figure 5:
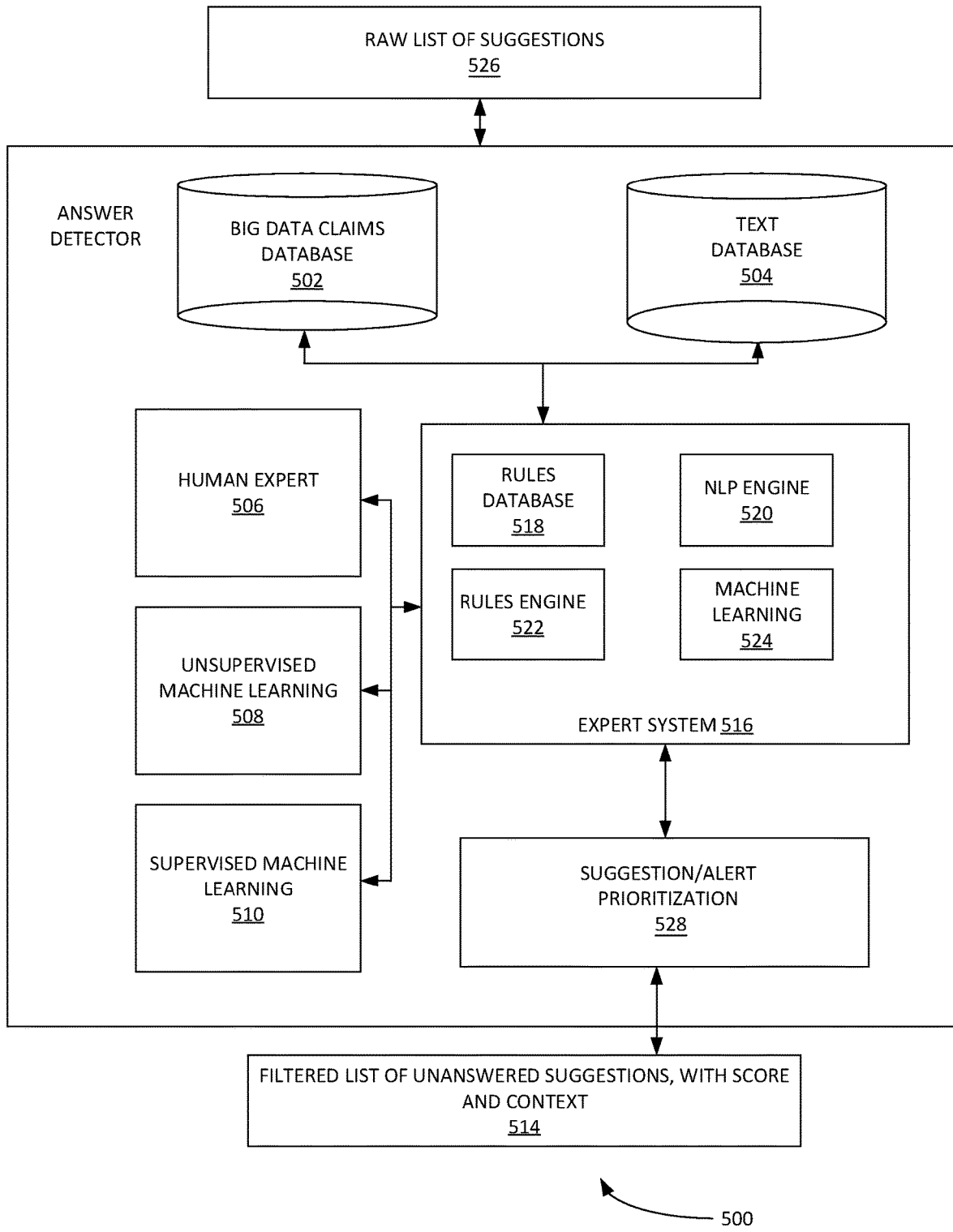
FIG. 5 illustrates an example system for generating a filtered list of unanswered suggestions, with score and context, according to some embodiments.

FIG. 5 illustrates an example system 500 for generating a filtered list of unanswered suggestions, with score and context, according to some embodiments. System 500 includes an answer detector as shown. System 500 includes big data claims database 502 (e.g. an HBASE) of structured data and unstructured data such as, inter alia: claim notes other documents. System 500 includes a text database 504 (e.g. SOLR/ELASTICSEARCH). Text database 504 includes, inter alia: stop-word filtering, synonym filtering, stemming, indexing, etc. Human expert(s) 506 can configure words and phrases, NLP models for claim signature detection and for answer detection. Unsupervised machine-learning module 508 can learn new rules and phrases. Supervised machine learning module 510 can refine words, phrases, NLP models, claims patterns, answer patterns, etc.

Expert system 512 can provide expert-configured and machine-learned rules, domain specific models, claim patterns, answer patterns for each question; search for words/phrases (e.g. expert-configured and learned) in claim notes and NLP-based semantic context-question has been answered; prioritized unanswered questions for recommendation. Expert system 516 can include a rules database 518, an NLP engine 520, a rules engine 522 and a machine-learning engine 524. Question prioritization module 518 can provide a combination of machine-learning for statistical techniques and expert rules to score and prioritize questions; score prioritization from previous steps are taken as inputs along with other factors to recalculate final score. Accordingly, answer system can provide filtered list of unanswered suggestions, with score and context 514.

Figure 6:
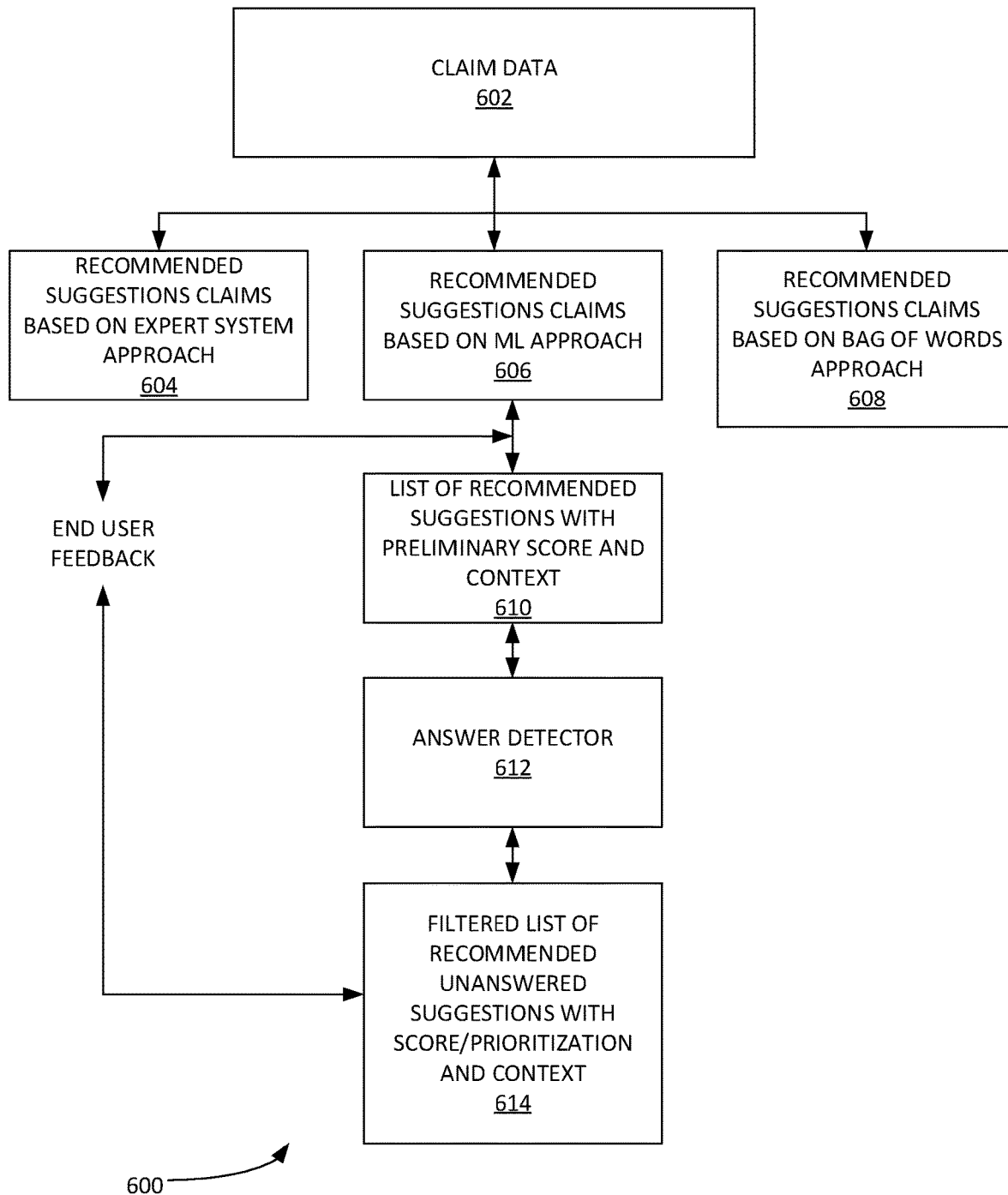
FIG. 6 illustrates an example process for generating a filtered list of recommended unanswered suggestions with score/prioritization and context, according to some embodiments.

FIG. 6 illustrates an example process 600 for generating a filtered list of recommended unanswered suggestions with score/prioritization and context, according to some embodiments. In step 602, process 600 obtains claim data. The claim data can include structured data and/or unstructured data (e.g. claim notes/other documents such as OCR text, etc.). In step 604, process 600 can recommended suggestions claims based on expert system. In step 606, process 600 can recommended suggestions claims based on ML approach. In step 608, process 600 can recommended suggestions claims based on bag of words. In step 610, process 600 can list of recommended suggestions with preliminary score and context. It is noted that some suggestions may already have been answered. In step 612, process 600 can implement an answer detector. In step 614, process 600 can generate a filtered list of recommended unanswered suggestions with score/prioritization and context.

FIGS. 7-10 illustrate example systems 700-1000 for implementing a system for claims investigation and red-flags provision, according to some embodiments.

In systems 700-1000, a combination of steps is performed for prediction and context extraction. An expert system is provided. Words and phrases are drafted based on expert experience and configured in an expert system database. Expert system is configured with rules to detect red flags and fraud schemes.

Claim notes are indexed into a text-based document store database. As the data is loaded, it can be manipulated in certain ways such as stemming, stop-words filtering with a domain-specific stop-word list, term expansion based on a domain-specific dictionary. The expert system can search for the phrases and obtain snippets from the claim notes containing the snippets. The expert system can perform NLP to implement context and semantic interpretation of the phrases to confirm whether they serve the intent of the expert rule. Various phrases that align with the intent are kept and others are discarded.

The expert system can implement techniques such as, inter alia: regular-expression and topic extraction. The expert system can combine phrases to trigger events/redflags. Some of the events/redflags may be binary and/or others can have a score associated with them. For example, the expert system can AND/OR rules based on expert knowledge.

Systems 700-1000 can implement supervised machine-learning based. Supervised machine-learning coring and statistical modeling based a combination events to detect patterns. Based on any observed patterns, the expert system predicts whether the claim has any red flags or is potentially fraudulent. The expert system is tuned for maximum recall.

The expert system can implement entity extraction and link analysis. The expert system can extract entities and vehicles from claim notes and claim documents using NLP techniques. The expert system can lookup entities in watchlists and on social media to determine if any suspicious or high-risk entities are associated with the claim. The expert system can perform link analysis on claim entities, vehicles, etc. to detect organized activity. The expert system can provide red flags based on entity analysis/link analysis/social network analysis.

The expert system can implement machine learning as well. For example, The expert system can implement a combination of supervised, unsupervised and reinforcement machine-learning techniques are used to come up with suggestions. The expert system can implement supervised learning. In one example, a corpus of claim notes and other claim documents at the FNOL stage are first converted to text using optical character recognition (OCR) techniques. This is appended to the structured data for the claim. This is then annotated or tagged by the experts with a list of red flags and fraud schemes (where applicable) for each claim. An expert can annotate each suggestion with context keywords and phrases for that suggestion. Various transformations are performed on the claim documents text and annotations, such as, inter alia: stemming, join-word merging, stop-word filtering, synonym-extraction and filtering, bag of words conversion, etc. These convert each annotated claim document to a string of tokens. Further transformations (such as, inter alia, word-vectorization, etc.) can be performed on these tokens to convert the document to a time series of vectors or tensors. This vector/tensor time series (along with claims structured data) can be used as input to machine learning.

Machine-learning models (such as deep learning RNN, SVM, GBM) are trained with the annotated data to be able to predict red flags, along with their context, based on claim notes at FNOL stage. Additionally, the machine-learning model is instrumented to provide context data as one of the outputs. In this way, machine-learning models can be modified to learn and provide context information along with suggestions. In addition, an expert system-based context extractor can be used to tune the context.

Unsupervised learning methods are now discussed. Unsupervised learning techniques (such as, inter alia: clustering, topic extraction and frequent pattern mining, various combinations thereof, etc.) are used to extract features and rules, and then, cluster similar claims together. Claim notes and other claim documents can first be converted to text using optical character recognition (OCR). Various transformations are performed on the resulting text, such as, inter alia: stemming, join-word merging, stop-word filtering, synonym-extraction and filtering, and bag of words conversion. These convert each claim document to a string of tokens. These are then indexed to create dictionaries for various key concepts to be learned. Further transformations (such as, inter alia, word-vectorization, etc.) is performed on these tokens to convert the document to a time series of vectors or tensors. This vector/tensor time series along with claims structured data is used as input to machine learning. The unsupervised learning techniques learns dictionaries of key concepts as well as synonyms. The unsupervised learning techniques also learns nuances of various claims adjusters and similarities and differences between them. The unsupervised learning techniques then uses anomaly detection techniques to come up with red flags.

Reinforcement learning methods are now discussed. An end-user feedback loop in implemented in the user interface, using which the end user (e.g. claims adjuster/supervisor) can provide feedback on the suggestions provided by expert system, supervised or unsupervised machine learning. The user can provide a positive or negative feedback. Accordingly, reinforcement learning learns patterns of when the users provided positive versus negative feedback, and accordingly, tunes the system to provide more meaningful and targeted flags. Reinforcement learning is used as a layer on top of expert system and other machine-learning to fine tune to suggestions and remove noise. It adds good bias towards the customer's business process. Additionally, it is noted that, machine-learning feeds back into the expert system to refine the NLP models and enhance expert system rules. It is noted that multiple processes are run in parallel to speed up processing time. Additionally, various cost estimator models can be added to the machine-learning to estimate claim(s) costs.

Figure 7:
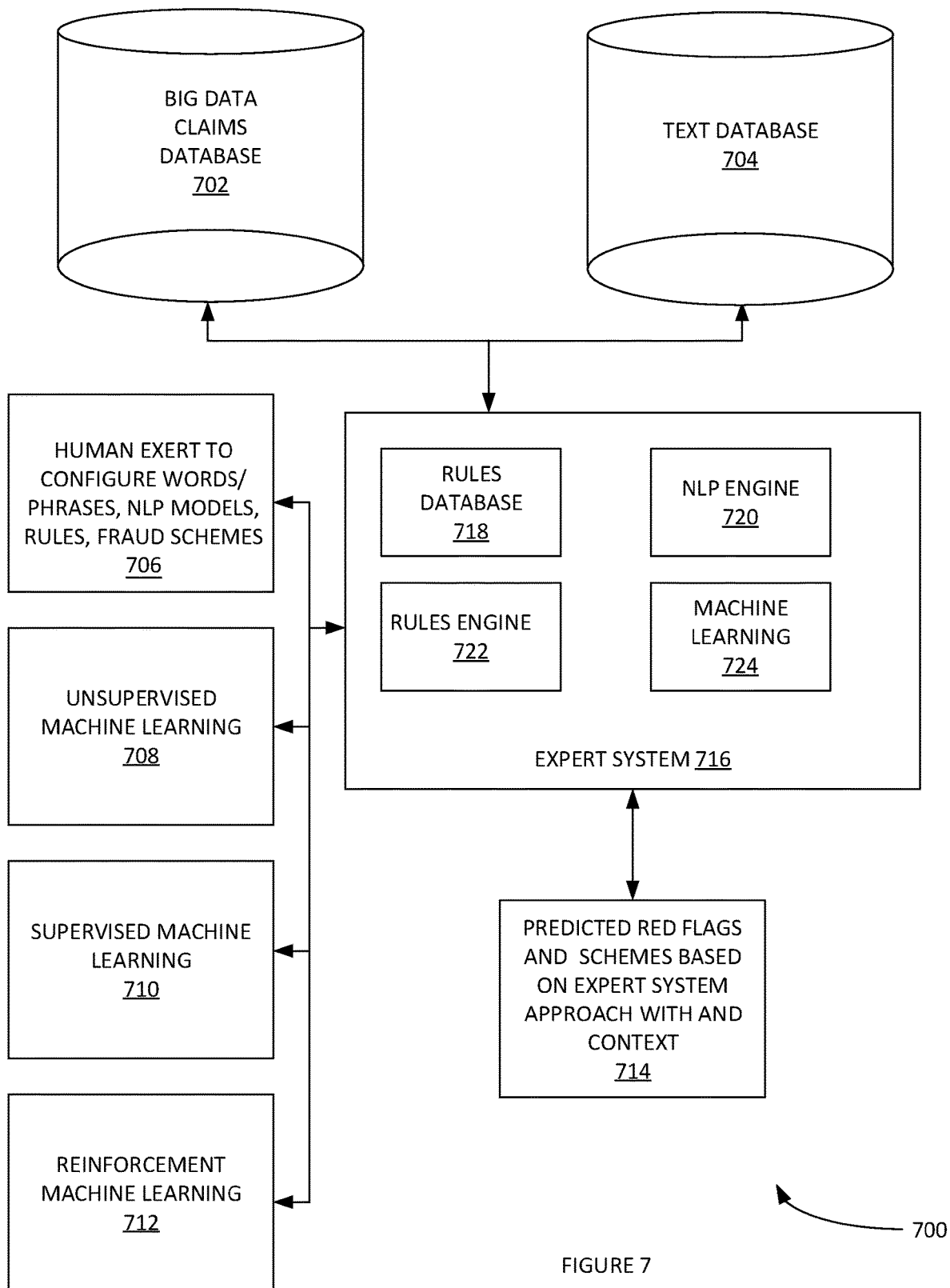
FIG. 7 illustrates an example system for predicted red flags and schemes based on expert system approach with and context, according to some embodiments.

FIG. 7 illustrates an example system 700 for predicting red flags and schemes based on expert system approach with and context, according to some embodiments. Big data claims database 702 can include structured data and/or unstructured data (e.g. claim notes other documents). Text database 704 can include stop-word filtering, synonym filtering, stemming indexing, etc. A human expert 706 can configure words/phrases, NLP models, rules, fraud schemes. Unsupervised machine-learning 708 can learn new words/phrases, patterns. Supervised machine-learning 710 can refine words/phrases, NLP models, etc. Reinforcement machine-learning 712 can refine words/phrases, NLP models, rules, fraud models, etc.

An expert system 716 can be provided. Expert system 716 can provide expert configured fraud models, red flag rules and domain specific NLP models. Expert system 716 can search for words/phrases (expert-configured and learned) in claim notes. Expert system 716 can NLP-based semantic context-detection to ensure the snippets capture the intent of the expert. Expert system 716 can combine phrases into events and redflags. Expert system 716 can score the events/redflags where appropriate. Expert system 716 can combine events, along with structured data and time series analysis to detect patterns apply machine-learning on the patterns to predict various fraud schemes. System 700 generates predicted red flags and schemes based on expert system approach with and context 714.

Figure 8:
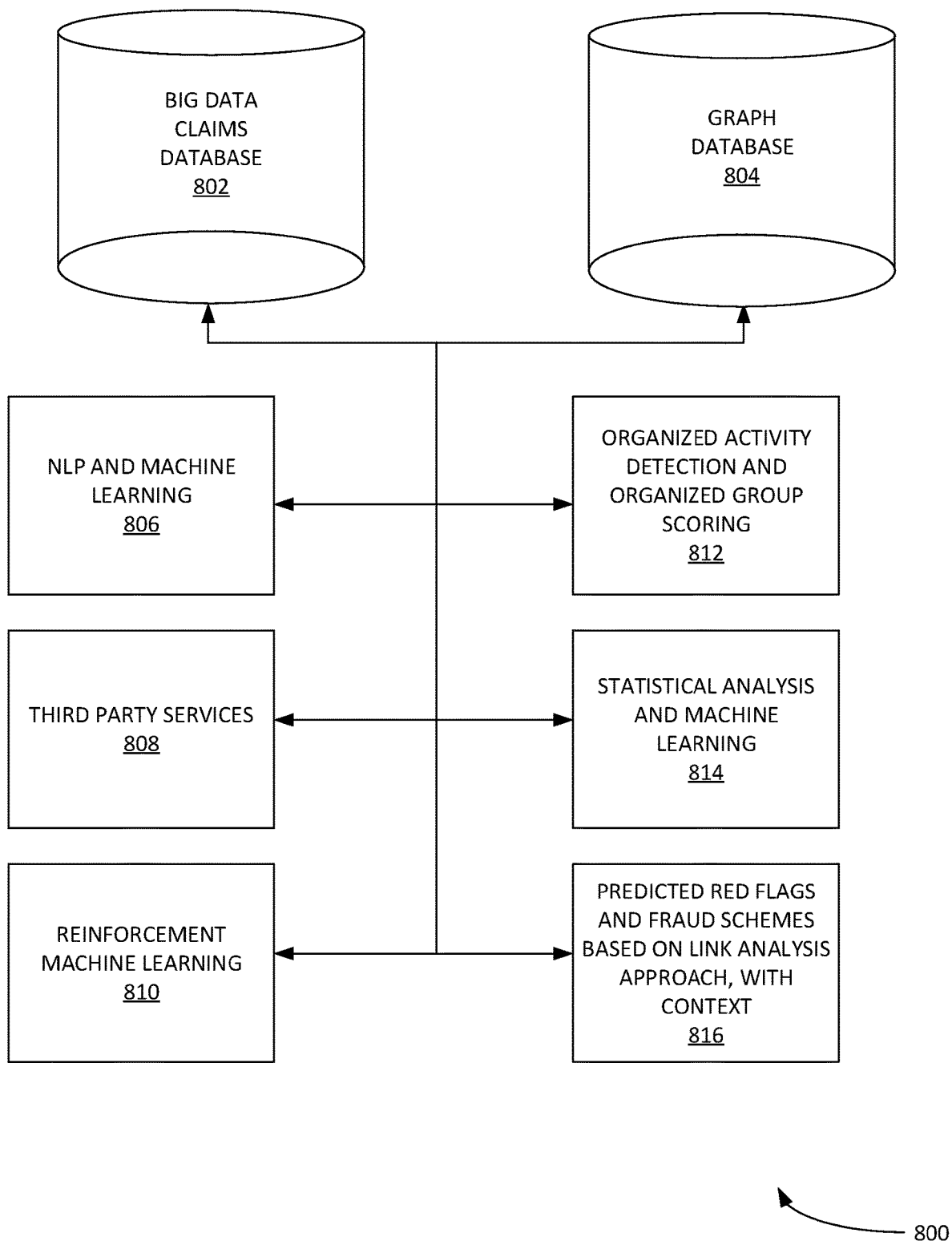
FIG. 8 illustrates an example system for generating litigation/settlement likely claims based on lawyer/AOB/suspect entity approach, with context, according to some embodiments.

FIG. 8 illustrates an example system 800 for generating litigation/settlement likely claims based on lawyer/AOB/suspect entity approach, with context, according to some embodiments. System 800 can include big data claims database 802. Big data claims database 802 can include structured data and/or unstructured data (e.g. claim notes, other documents, etc.). System 800 can include NLP and machine-learning 806. NLP and machine-learning 806 can provide named entity extraction; pattern-based entity extraction; machine-learning based entity extraction; etc. Third-party services 808 can include, inter alia: (e.g. California Bar Association, NICB reports, etc.), and/or information about suspect entities (lawyers, contractors, doctors, etc.)

System 800 can include reinforcement machine-learning 810. Reinforcement machine-learning 810 can refine entities info and scores. System 800 can group detection module 812 for organized activity detection and organized group scoring. System 800 can include statistical analysis and machine learning module 814. System 800 can generate predicted red flags and fraud schemes based on link analysis approach, with context 816.

Figure 9:
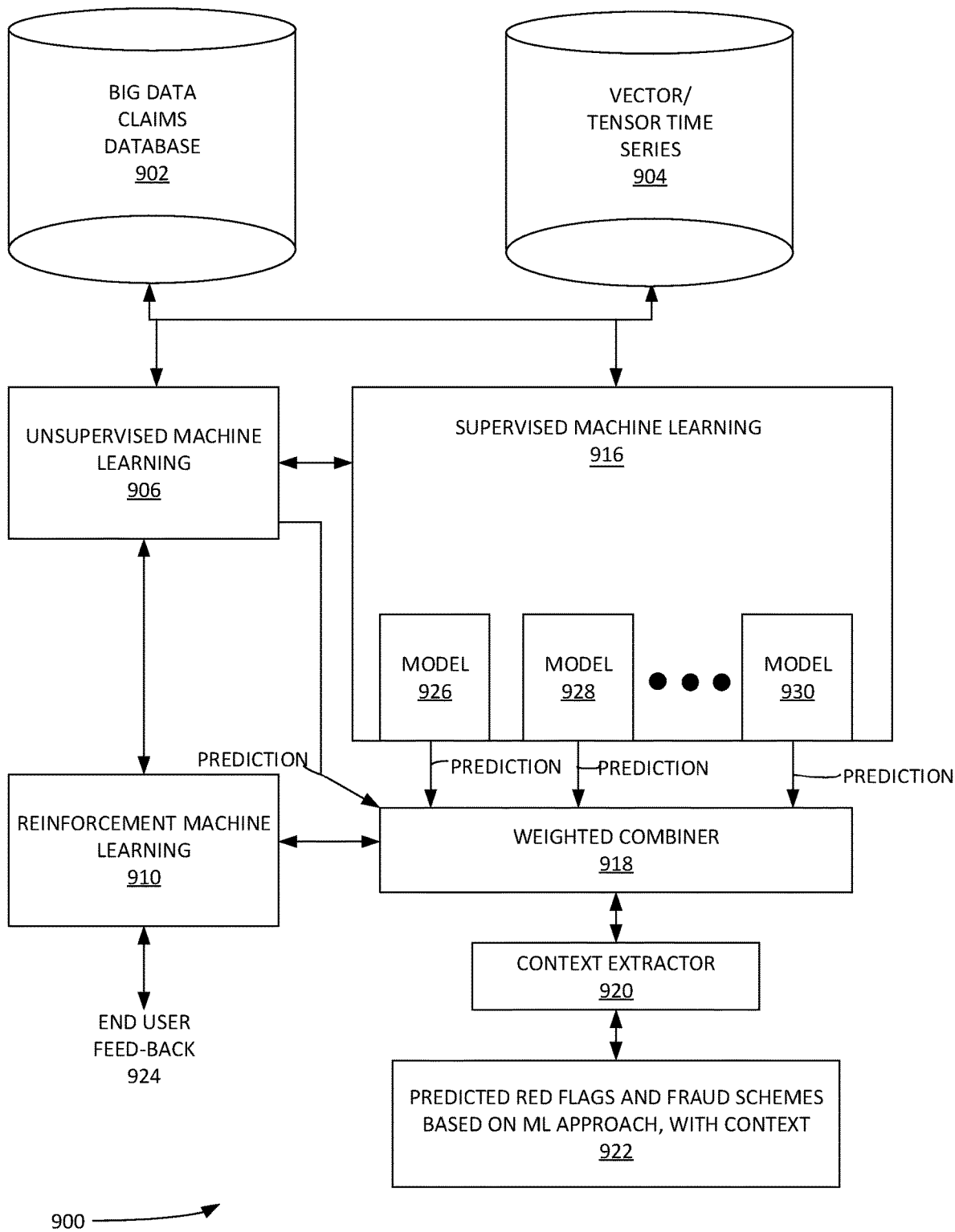
FIG. 9 illustrates an example system for generating predicted red flags and fraud schemes based on ML approach, according to some embodiments.

FIG. 9 illustrates an example system 900 for generating predicted red flags and fraud schemes based on ML approach, according to some embodiments. System 900 can include big data claims database 902. Big data claims database 902 can include structured data and/or unstructured data (e.g. claim notes and other documents). System 900 can include a vector/tensor time series database 904. Vector/tensor time series database 904 can include, inter alia: stop-word filtering; synonym filtering; stemming; n-gram filtering; word vectorization; topic extraction; bag of words transform; etc.

System 900 includes unsupervised machine-learning module 906. unsupervised machine-learning module 906 can implement, inter alia: clustering; topic/concept extraction; frequent pattern mining; learn significant phrases, patterns, concepts; etc.

System 900 includes reinforcement machine-learning 910. Reinforcement machine-learning 910 can implement, inter alia: refine words/phrases to use for machine-learning and their weights.

System 900 includes supervised machine-learning module 916. Supervised machine-learning module 916 can create multiple ML models 926-930; relevant predictions; etc. System 900 includes weighted combiner 918 and context extractor 920. Context extractor 920 can obtain, inter alia: top phrases used in prediction; topic extraction using NLP; etc. System 900 can then a generate predicted red flags and fraud schemes based on ML approach, with context.

Figure 10:
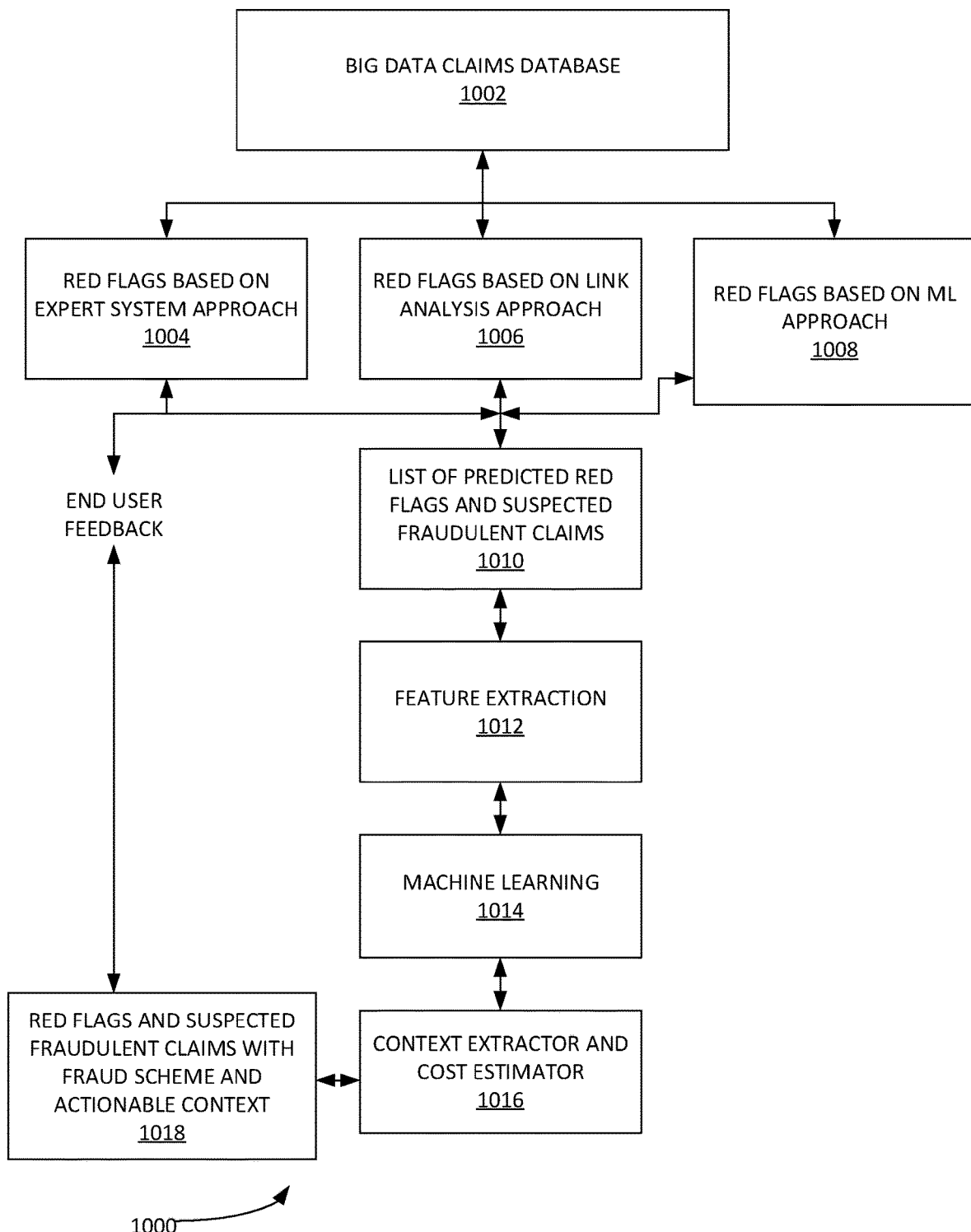
FIG. 10 illustrates an example system for generating red flags and suspected fraudulent claims with fraud scheme and actionable context, according to some embodiments.

FIG. 10 illustrates an example system 1000 for generating red flags and suspected fraudulent claims with fraud scheme and actionable context, according to some embodiments. System 1000 includes big data claims database 1002. Big data claims database 1002 includes structured data and/or unstructured data (e.g. claim notes other documents). A red flags based on expert system approach 1004 can be implemented. A red flags based on link analysis approach 1006 can be implemented. A red flags based on ML approach 1008 can be implemented. A list of predicted red flags and suspected fraudulent claims can be provided. List 1010 can include structured data and/or unstructured data (e.g. claim notes other documents). Feature extraction 1012 can be implemented. Feature extraction 1012 can include, inter alia: structured data columns (location, cause of loss, insured details, etc.); events, red flags, phrases from unstructured data; claim notes bag of words as time series; entities extracted from unstructured data; claim costs and historic claim costs; other features. Machine-learning 1014 can be used for predictive modeling, claim scoring; etc. Context extractor and cost estimator 1016 can determine context from the previous steps. Context extractor and cost estimator 1016 can determine entity information and statistics. Context extractor and cost estimator 1016 can implement an expert system based additional context. Context extractor and cost estimator 1016 can implement statistical and traditional machine-learning-based cost estimation. System 1000 can generate red flags and suspected fraudulent claims with fraud scheme and actionable context 1018.

FIGS. 11-14 illustrates systems 1100-1400 for implementing claims litigation prediction. Systems 1100-1400 can include an expert system. Words and phrases are drafted based on expert experience and configured in an expert system database. Claim notes are indexed into a text-based document store database (e.g. SOLR). As the data is loaded, it is manipulated in certain ways such as, inter alia: stemming, stop-words filtering with a domain-specific stop-word list, term expansion based on a domain-specific dictionary. The expert system can search for the phrases and obtain snippets from the claim notes containing the snippets. The expert system can perform NLP to do context and semantic interpretation of the phrases to confirm whether they serve the intent of the expert rule. Only phrases that align with the intent are kept and others may be discarded.

The expert system can implement various techniques, such as, regular-expression and topic extraction. The expert system can combine phrases to trigger events/redflags. Some of the events/redflags are binary, others can have a score associated with them. The expert system can implement AND/OR rules based on expert knowledge.

The expert system can implement supervised machine learning based on various factors. The expert system can implement scoring and statistical modeling. The expert system can combine events to detect patterns. Based on patterns seen, the expert system predicts the likelihood of a claim going into litigation. This can narrow down the relevant space. The expert system can be tuned for maximum recall.

The expert system can implement AOB and lawyer detection. The expert system can include a database of lawyers for look up. The expert system can search for terms such as "law firm", "attorney", "atty", etc. The expert system can provide phrases indicating AOB. An AOB can be marked by a customer, in some cases.

The expert system can enable the scoring of lawyers in the database and predict litigation/settlement based on said scoring. It is noted that the expert system can merge expert system and AOB/Lawyer detection claims (e.g. to narrow the space). The expert system can add machine learning with multiple Bag-Of-Words (BOW) based models (e.g. SVM) and/or time series vector/tensor flow (e.g. RNN). The expert system can locate all claims having a particular phrase or set of phrases, that narrows the space, then train adding redundancy. These can be further broken down based on city/state, cause of loss, etc. Multiple processes are run in parallel to speed up processing time. The expert system can determine and extract delta in claim notes for the last few weeks leading to a litigation/settlement and convert to BOW and time series vectors/tensors. The expert system can extract organizations and entities from claims. Entity scoring can be based on statistical analysis. The expert system can PCA to identify key organizations, events, phrases based in temporal tensor space leading to a litigation/settlement. The expert system can train machine learning models based on this and the models for predict operations. The expert system can implement various classification, clustering, anomaly detection, etc. The extracted phrases can be used to determine context. Additionally, the expert system can add a separate context extractor. A set of phrases that are used to predict can be determined. The expert system can also determine phrases that may not be used to predict, but are found quite often in litigated claims and may indicate something actionable. Reinforcement machine learning provides positive/negative feedback on the predictions and is used to further tune the models and predictions. A cost estimator can be used to estimate claim costs.

Figure 11:
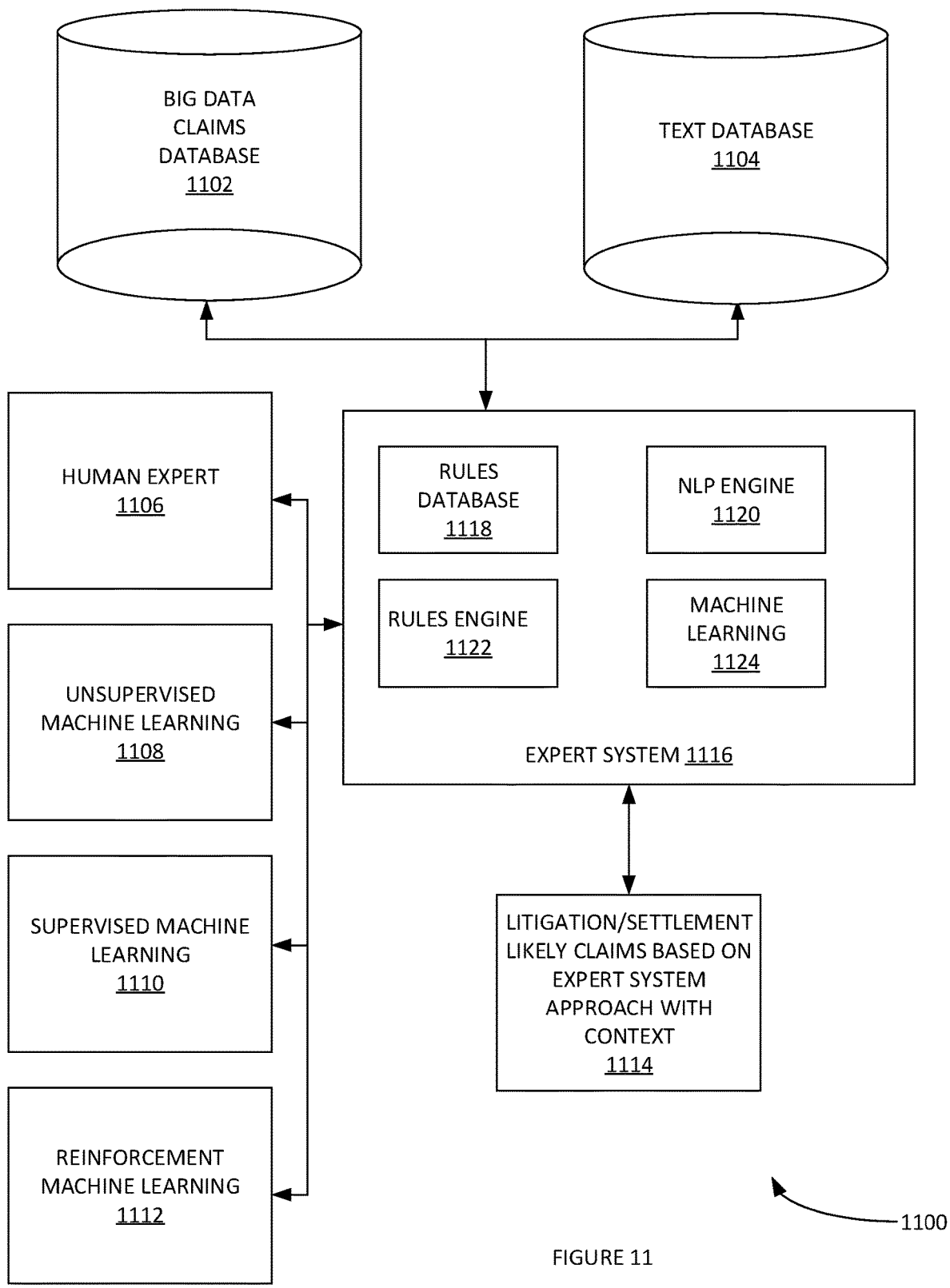
FIG. 11 illustrates an example system for determining litigation/settlement likely claims based on expert system approach with context, according to some embodiments.

FIG. 11 illustrates an example system 1100 for determining litigation/settlement likely claims based on expert system approach with context, according to some embodiments. System 1100 can include big data claims database 1100. Big claims data base 1100 can include structured data and/or unstructured data (e.g. claim notes and other documents). System 1100 can include text database 1104. Text database 1104 can include stop-word filtering, synonym filtering, stemming, indexing, topic extraction, word vectorization, etc. Human expert 1106 can configure words/phrases, NLP models, rules. Unsupervised machine-learning module 1108 can learn new words/, patterns, clusters. Supervised machine-learning module 1110 can refine predictions, score claims. Reinforcement machine-learning module 1112 can refine words/phrases, NLP models, etc. Expert system 1116 can provide expert configured rules and domain specific NLP models for litigation/settlement prediction; search for words/phrases (expert-configured and learned) in claim notes; NLP-based semantic context-detection to ensure the snippets capture the intent of the expert; combine phrases into events and red flags; score the events/red flags where appropriate; combine events, along with structured data and time series analysis to detect patterns; and/or apply machine-learning on the patterns to predict litigation. Expert system 1116 can include a rules database 1118, an NLP engine 1120, a rules engine 1122 and a machine-learning engine 1124. System 1100 can generate litigation/settlement likely claims based on expert system approach with context.

Figure 12:
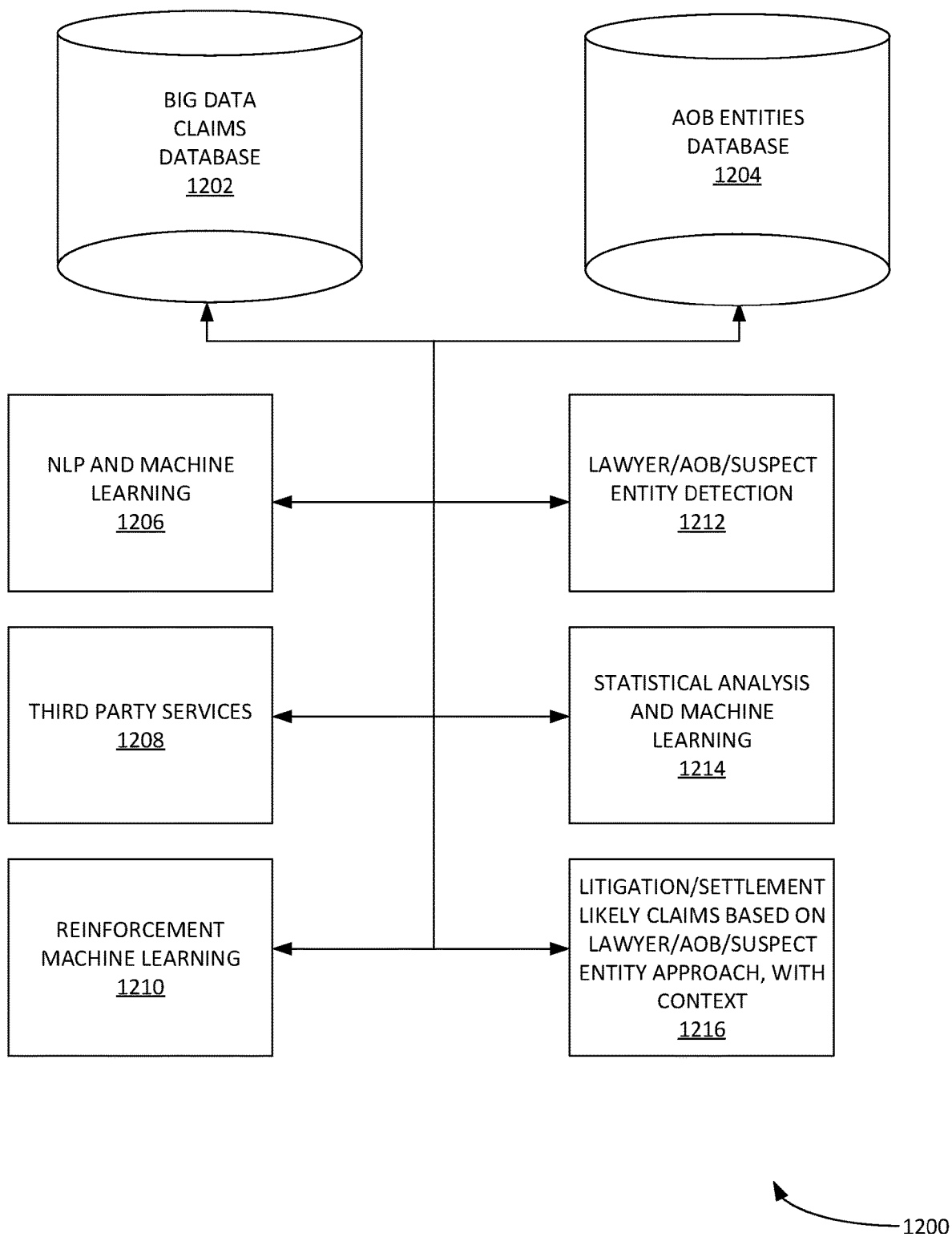
FIG. 12 illustrates an example system for generating litigation/settlement likely claims based on expert system approach with context, according to some embodiments.

FIG. 12 illustrates an example system 1200 for generating litigation/settlement likely claims based on expert system approach with context, according to some embodiments. system 1200 can include big data claims database 1202. Big data claims database 1202 can include structured data and unstructured data (e.g. claim notes other documents). System 1200 can include AOB entities database 1204. AOB (Assignment of Benefits) entities databases 1204 can include phrases indicating AOB; entities list (e.g. lawyers/contractors/doctors/agents, etc.) with statistics and scores. NLP and machine-learning module 1206 can implement named entity extraction; pattern-based entity extraction; machine-learning based entity extraction; semi-supervised machine-learning to learn phrases indicating AOB; etc. Third-party services 1208 (e.g. California bar association, NICB reports, etc.) can provide information about suspect entities (e.g. lawyers, contractors, doctors, etc.). Reinforcement machine-learning module 1210 can refine entities info and scores. Lawyer/AOB/suspect entity detection 1212 can be implemented. Statistical analysis and machine learning 1214 can be implemented. Accordingly, litigation/settlement likely claims based on lawyer/AOB/suspect entity approach, with context 1216 can be generated.

Figure 13:
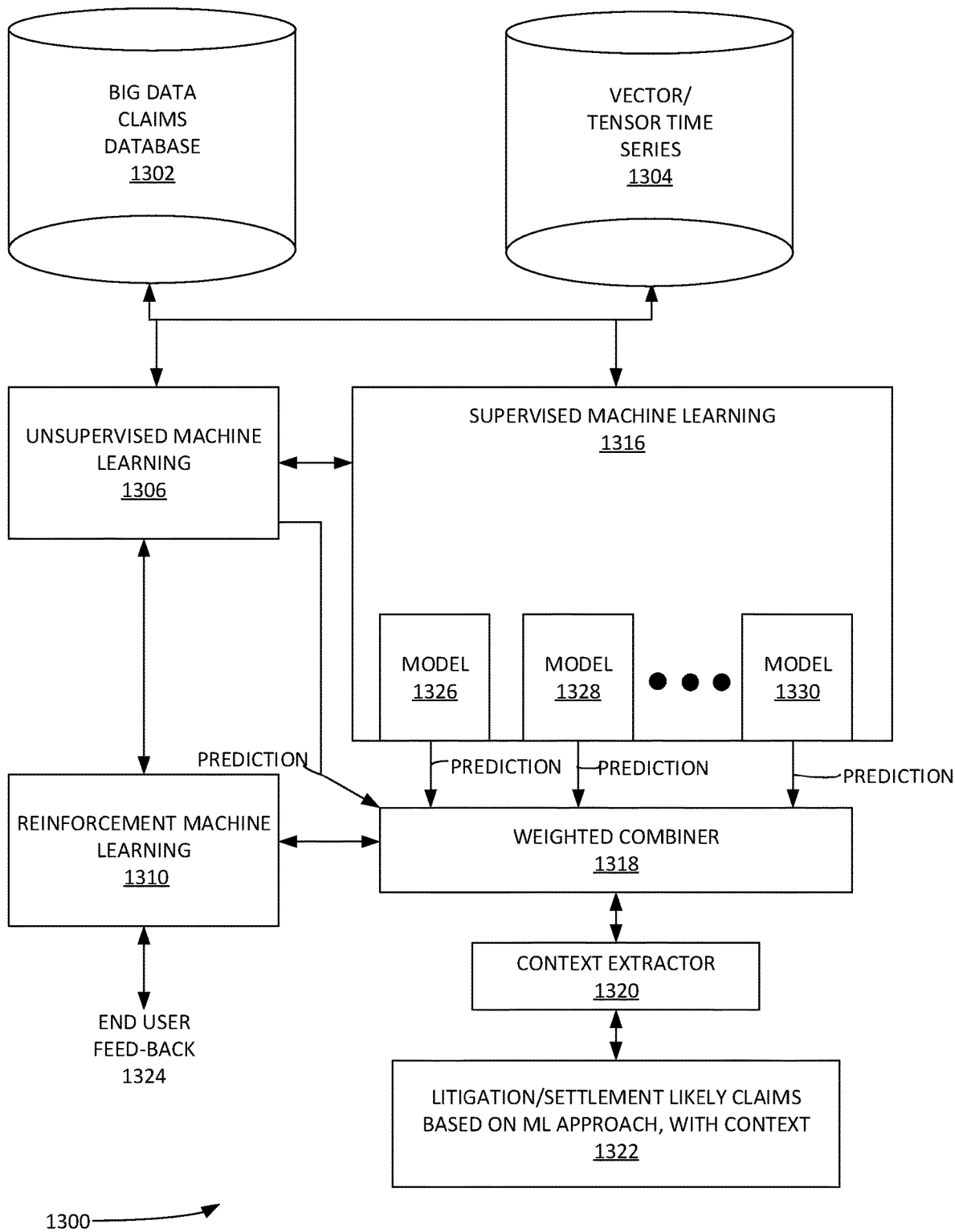
FIG. 13 illustrates an example system for generating litigation/settlement likely claims based on ML approach, according to some embodiments.

FIG. 13 illustrates an example system 1300 for generating litigation/settlement likely claims based on ML approach, according to some embodiments. System 1300 can include big data claims database 1302. Big data claims database 1302 can include structured data and unstructured data (e.g. claim notes other documents). System 1300 can include a vector/tensor time series database 1204. Vector/tensor time series database 1204 can include, inter alia: stop-word filtering, synonym filtering, stemming, n-gram filtering, topic extraction, word-vectorization, bag of words, etc. System 1300 can include an unsupervised machine-learning module 1306. Unsupervised machine-learning module 1306 can implement/determine clustering, frequent pattern mining learn words and phrases, patterns that appear in a higher percentage of litigated/settled claims than in other claims, etc. System 1300 can include a reinforcement machine-learning module 1310. Reinforcement machine-learning module 1310 refine words/phrases ad determine various patterns to use for machine-learning and their weights. System 1300 can include supervised machine-learning module 1316. Supervised machine-learning module 1316 can create multiple ML models 1326-1330 used to make various predictions that are then fed to weighted combiner 1318. Context extractor 1320 can determine the top phrases used in prediction and implement topic extraction using NLP. Accordingly, system 1300 can generate litigation/settlement likely claims based on ML approach, with context.

Figure 14:
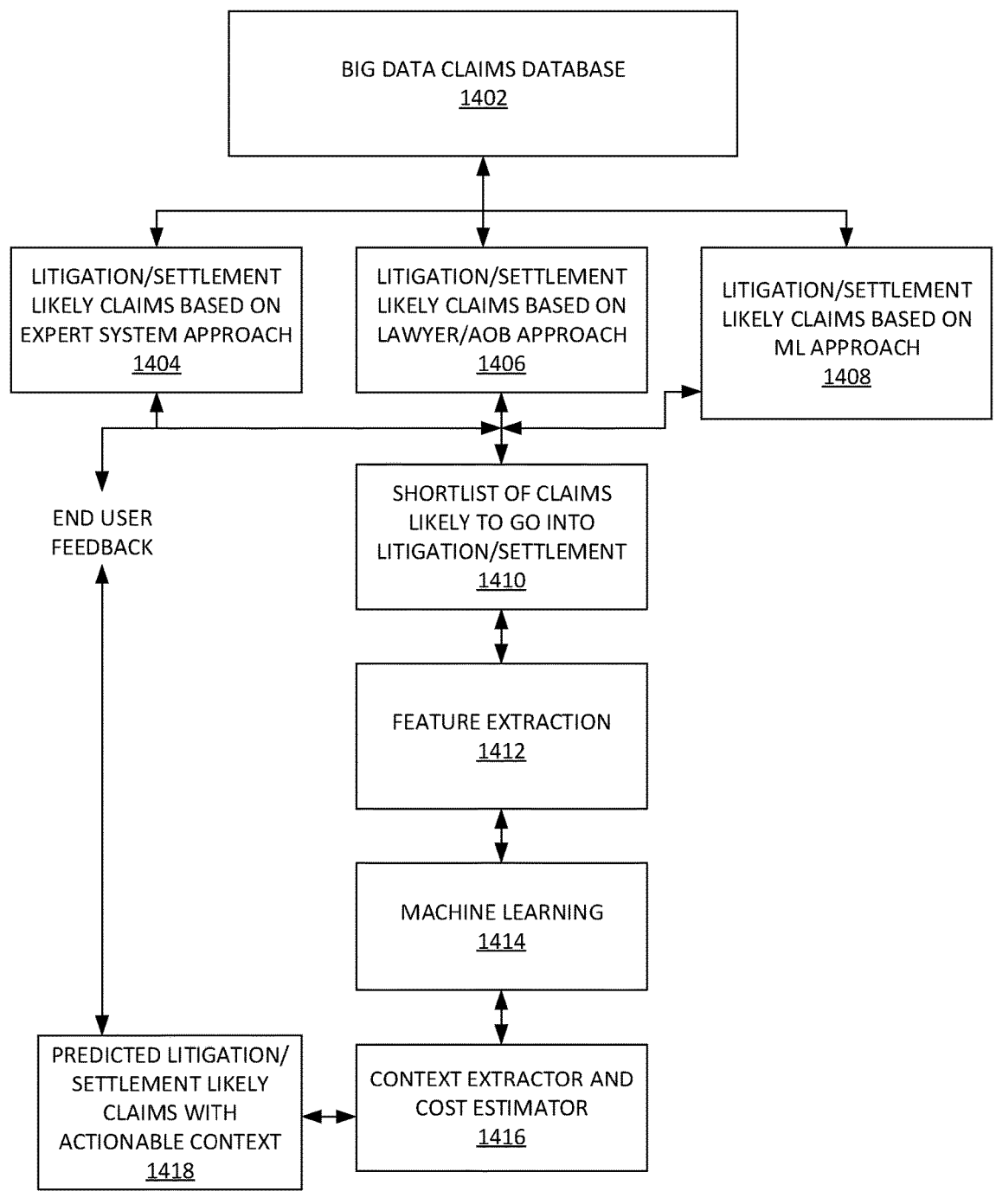
FIG. 14 illustrates an example system for generating predicted litigation/settlement likely claims with actionable context, according to some embodiments.

FIG. 14 illustrates an example system for generating predicted litigation/settlement likely claims with actionable context, according to some embodiments. Big data claims database 1402 can include structured data and unstructured data (e.g. claim notes other documents). System 1400 can determine litigation/settlement likely claims based on expert system approach 1404. System 1400 can determine litigation/settlement likely claims based on lawyer/AOB approach 1406. System 1400 can determine litigation/settlement likely claims based on ML approach 1408. A shortlist of claims likely to go into litigation/settlement structured data unstructured data claim notes other documents 1410 can be generated.

Feature extraction 1412 can be implemented. Feature extraction 1412 can determine structured data columns (location, cause of loss, insured details, etc.); events, red flags, phrases from unstructured data; last n-weeks delta claim notes bag of words as time series; entities extracted from unstructured data; claim costs and historic claim costs; other features; etc. Machine-learning 1414 can implement predictive modeling and determine precision fine-tuning (reduce false positives).

Context extractor and cost estimator 1416 can obtain the context from the above process. Context extractor and cost estimator 1416 can obtain/calculate entity information and statistics. Context extractor and cost estimator 1416 can determine an expert-system based additional context. Context extractor and cost estimator 1416 can implement statistical and traditional machine-learning based cost estimation. Accordingly, system 1400 can provide predicted litigation/settlement likely claims with actionable context 1418.

Creating and Summarizing Unstructured Natural Language Sentence Clusters for Efficient Tagging/Annotation A method and apparatus for extracting insights from case files with large amount of unstructured data is now discussed. The method can use a mechanism for reducing domain noise and creating and summarizing claim sentence clusters for efficient semantic tagging of case files such as insurance claims data. The method can use a mechanism for detecting base features based on semantic intent of tags and/or a hierarchical approach for combining the tagged features into insights. Optionally, the method can use a process for scoring insights.

Figure 15:
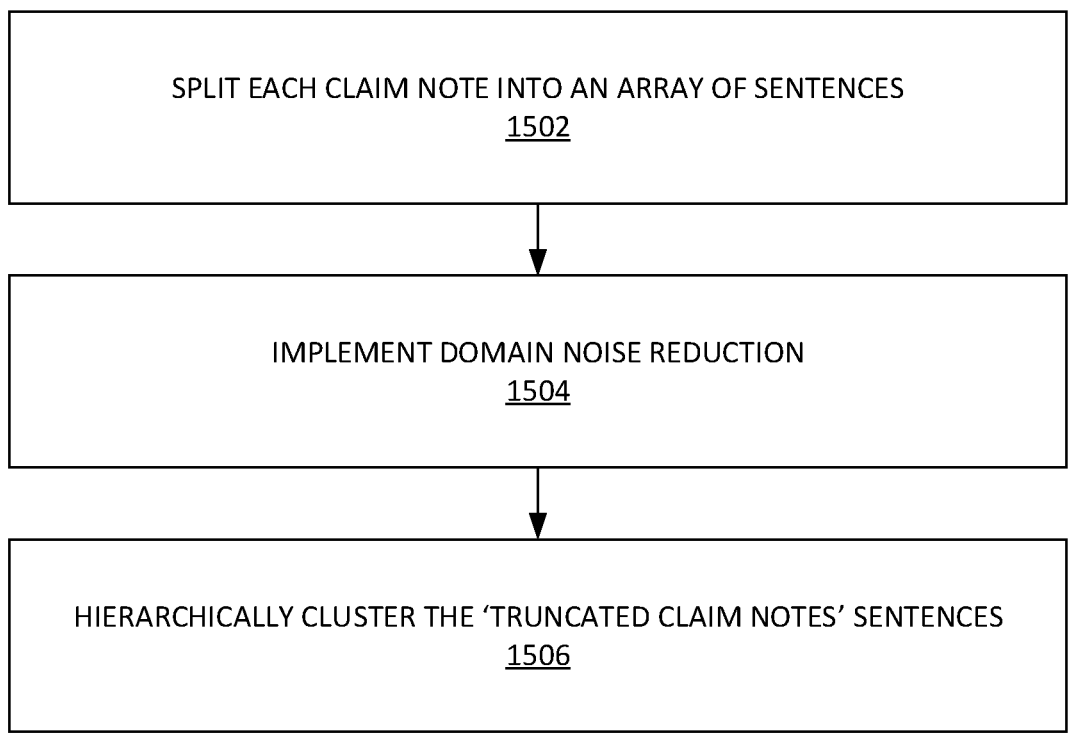
FIG. 15 illustrates an example process for creating and summarizing claim sentence clusters for efficient tagging of claims, according to some embodiments.

FIG. 15 illustrates an example process 1500 for creating and summarizing case file sentences into clusters for efficient tagging of claims, according to some embodiments. This is shown through an example of insurance claim notes. In step 1502 process 1500 splits each claim note into an array of sentences. Process 1500 can use a sentence splitter (e.g. using a Python NLTK) as a base. This can break down the claim into sentences.

The sentence splitting in step 1502 can be imperfect due to the case file not following proper English grammar. This can happen, for example, with insurance claim notes where the claims adjuster may use various shorthand notation or have typos in their documentation. The claims adjuster may also not make proper use of punctuations while typing fast. This can also happen, for example, with handwritten notes read by a computing system using OCR. Process 1500 can add a second hierarchical layer of custom sentence splitter. The sentence splitter acts upon the sentences already split by the base sentence splitter. The sentence splitter can have a model that is pre-trained based on the specific customer's data to recognize run-on sentences and sentence boundaries with missing punctuations. The model can use various techniques such as, inter alia: regular expressions, median sentence size, capitalization detection, SVM, RNN, etc. to identify typical grammar errors in the customer's data and detect sentence boundaries. The sentence splitter can further break down the sentences spit out by the base sentence splitter and convert them as ready for the next NLP pipeline stage.

Figure 16:
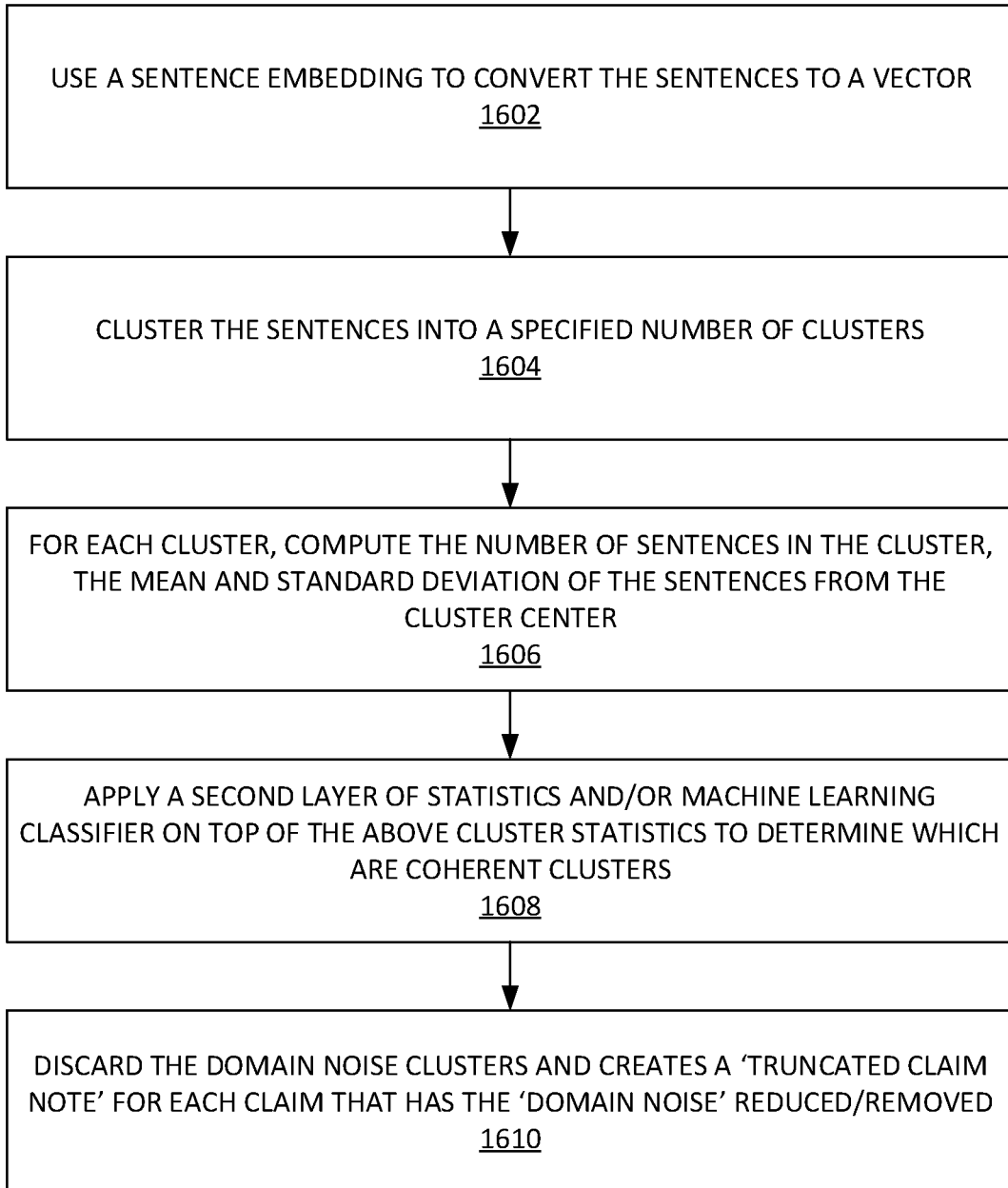
FIG. 16 illustrates an example process for implementing a domain noise reduction phase, according to some embodiments.

In step 1504, process 1500 implements domain noise reduction phase. FIG. 16 illustrates an example process 1600 for implementing a domain noise reduction phase, according to some embodiments. In step 1602, process 1600 can use a sentence embedding to convert the sentences to a vector. Various techniques such as, inter alia: Word2Vec with aggregation, Doc2Vec, Glove, Google Universal Sentence Encoder, TF-IDF, etc. can be used to convert a sentence to a vector.

In step 1604, based on the sentence embedding, process 1600 models (e.g. K-Means model) then cluster the sentences into a specified number of clusters (e.g. hundreds of clusters)). In step 1606, for each cluster, process 1600 then computes the number of sentences in the cluster, the mean and standard deviation of the sentences from the cluster center. In step 1608, process 1600 then applies a second layer of statistics and/or machine learning classifier on top of the above cluster statistics to determine which are coherent clusters (e.g. clusters with low mean and low standard deviation of the sentences from the cluster center, where "low" is relative to the above statistics). These coherent clusters at this stage can be the domain noise clusters. The process can add an additional layer to compare these clusters against various boiler plate text templates extracted from other documents in the case files (e.g. medical reports in an insurance claim file) to further validate and identify "domain noise" clusters.

In step 1610, process 1600 discard the domain noise clusters and creates a 'truncated claim note' for each claim that has the 'domain noise' reduced/removed. Process 1600 can be implemented separately for each category of claim or case file (e.g. based online/type of business, coverage, etc.). One skilled in the art can see that this technique can be extended to other embodiments and use cases beyond insurance claims processing.

Figure 17:
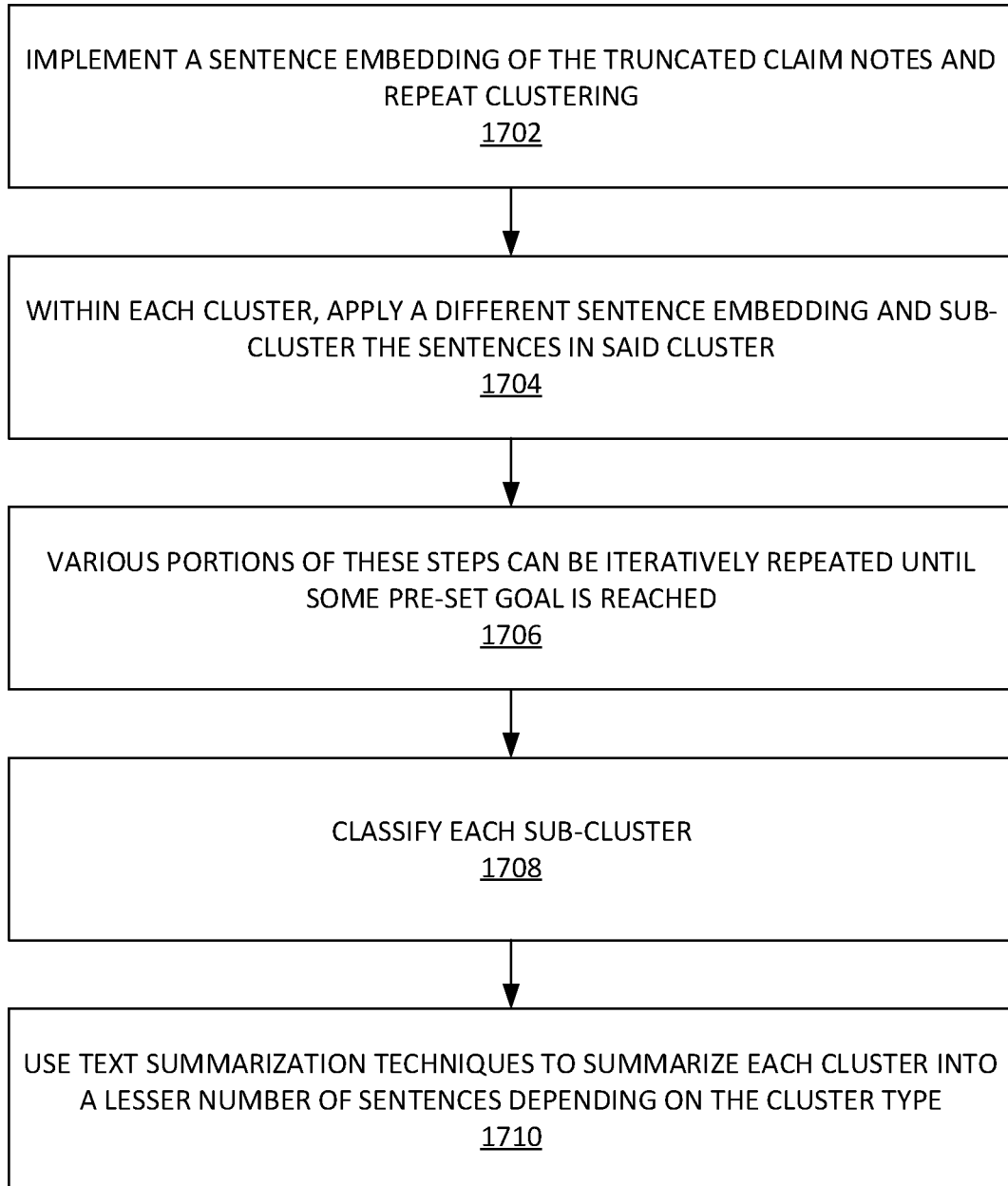
FIG. 17 illustrates an example process for hierarchically cluster the 'truncated claim notes' sentences, according to some embodiments.

In step 1506, process 1500 can hierarchically cluster the 'truncated claim notes' sentences. FIG. 17 illustrates an example process 1700 for hierarchically cluster the 'truncated claim notes' sentences, according to some embodiments. In step 1702, process 1700 can implement a sentence embedding of the truncated claim notes and repeat clustering. In step 1704, within each cluster, process 1700 can apply a different sentence embedding and sub-cluster the sentences in said cluster.

It is noted that various portions of these steps can be iteratively repeated until some pre-set goal is reached in step 1706 (e.g. a number of sub-clusters, number of sentences in each sub-cluster is reached). For example, a first use of Universal Sentence Encoder (e.g. Google Universal Sentence Encoder, etc.) can be to convert the sentence into a vector and cluster them into n-clusters (e.g. ten clusters, etc.). Within each cluster, process 1700 can take the sentences and cluster them using a different embedding method such as TF-IDF. Process 1700 can repeat until the end goal is reached. It is noted that this method of hierarchical clustering can use different features of the sentences at each stage of the hierarchy and provides a better clustering of the claim notes than using a larger number of clusters with the same feature set.

Process 1700 can now have a set of sub-clusters with sentences from the claim notes without domain noise. In step 1708, based on cluster metrics (e.g. number of sentences in each sub-cluster, mean and standard deviation from cluster center, etc.), process 1700 can then classifies each sub-cluster into one of the following categories (provided by way of example):
 Coherent: all the sentences in the cluster are semantically very close to each other;
 Mostly Coherent: most of the sentences in the cluster are semantically very close to each other, but there are a few outliers;
 Ring: the cluster sentences form a ring around the cluster center, with about four to seven (4-7) distinct sentence themes in the cluster.
 Discordant: the clusters can have sentences that are spread out all over the place from the cluster center.

In step 1710, process 1700 can use text summarization techniques to summarize each cluster into a lesser number of sentences depending on the cluster type. For example, a coherent cluster may only need one sentence to summarize the entire cluster. The mostly coherent and ring clusters may be summarized into a few (e.g. five to seven (5-7) sentences, etc.). Discordant clusters may be summarized using a larger number of sentences. It is noted that the summarized sentence clusters reduce the entire claim space (e.g. thousands of claims with hundreds of sentences each) into a few hundred sentences that capture the salient aspects of the insurance claims that can be tagged. This can make the tagging/annotation process much more efficient.

Figure 18:
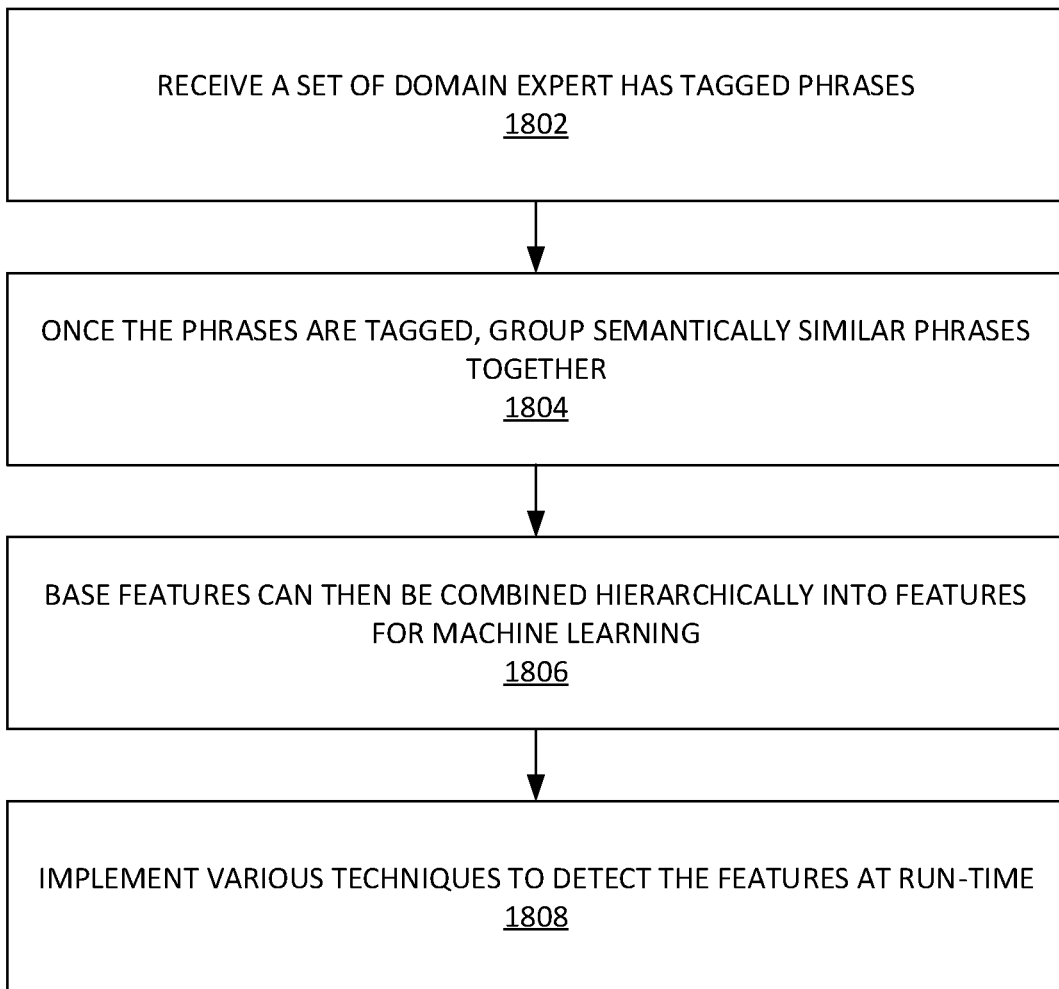
FIG. 18 illustrates an example process for detecting base features based on semantic intent of tags, and a hierarchical approach for combining the tagged features into insights, according to some embodiments.

FIG. 18 illustrates an example process 1800 for detecting base features based on semantic intent of tags, and a hierarchical approach for combining the tagged features into insights, according to some embodiments. In step 1802, process 1800 can receive a set of domain expert has tagged phrases. Once the domain expert has tagged phrases, process 1800 can identify semantically similar phrases. For example, the phrase "he went to the ER" is different from "he did not go to the ER" or "he skipped the ER visit" or "if an ER visit happened". In another example, the phrase, "he went to the ER" is the same as "he went to the emergency room", "she went to the hospital", etc. When the domain experts adds a tag on "went to ER", process 1800 can differentiate between these cases and correctly flags claims as "went to ER". Process 1800 can detect phrases that are semantically similar or dissimilar to the tags. It is noted that claims adjusters can use their own short-hand notations and may not use proper English grammar when documenting the claims. There can be several cases of punctuation marks missing or typos. This makes it more challenging to identify similar phrases. Features in insurance claims space are often times behavioral patterns, which may be some combination of semantic tags.

In step 1804, process 1800 can, once the phrases are tagged, group semantically similar phrases together. A connotation detector can be used to detect various connotations such as positive, negative, speculative and other connotations. Semantically similar phrases with similar connotations are then grouped into base features.

In step 1806, process 1800 base features can then be combined hierarchically into features (e.g. behavioral patterns, etc.) for machine learning. These features can be either inserted as rules in an expert system or as inputs into machine learning classifiers. Reinforcement learning can be added for continuous improvements to the models.

In step 1808, process 1800 can implement various techniques (such as, inter alia: sentence embedding, regular expressions, classifiers, and combinations thereof) to detect the features at run-time.

Figure 19:
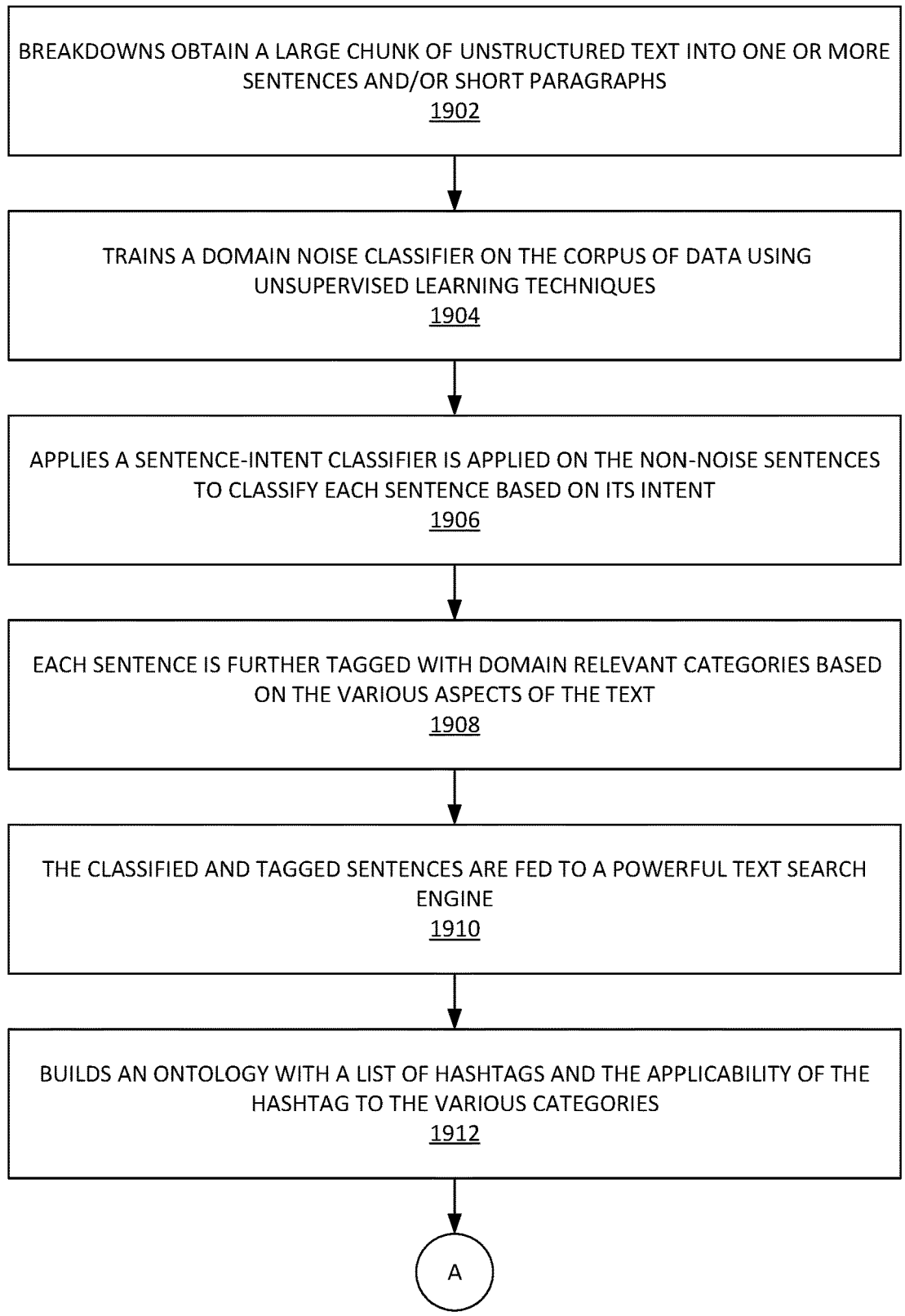
FIGS. 19 and 20 illustrates an example process for implementing a computerized natural language processing with insights extraction using semantic search, according to some embodiments.
Figure 20:
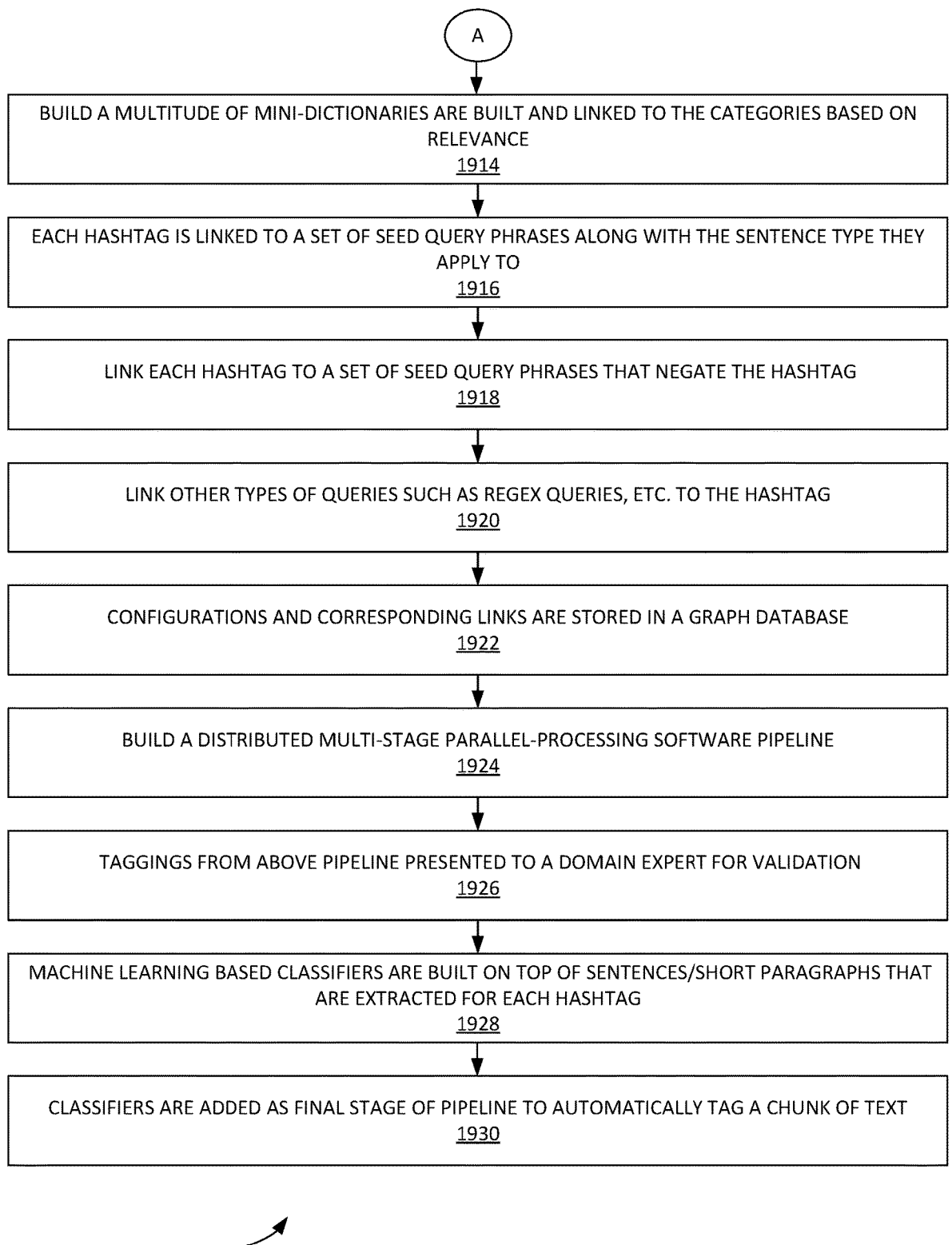

Computerized Natural Language Processing with Insights Extraction Using Semantic Search FIGS. 19 and 20 illustrates an example process 1900 for implementing a computerized natural language processing with insights extraction using semantic search, according to some embodiments.

In step 1902, process 1900 breakdowns obtain a large chunk of unstructured text (e.g. corpus of lengthy documents 2204, etc.) into one or more sentences and/or short paragraphs (e.g. 3-5 sentences each). A sentence splitter (e.g. sentence splitter 2206) can be used for this. Process 1900 can identify sentence boundaries when grammar rules are not followed.

In step 1904, process 1900 trains a domain noise classifier on the corpus of data using unsupervised learning techniques. In this step, process 1900 classifies each sentence as noise or non-noise. This can be done by classification system 2208. Multiple domain noise classifiers may be trained and applied, based on the nature of the corpus. For example, a template text without an answer may be classified as noise.

In step 1906, a sentence-intent classifier is applied on the non-noise sentences to classify each sentence based on its intent (e.g. affirmative sentence, negation sentence, tentative sentence, conditional sentence, etc.). Step 1906 can generate categorized and tagged sentences 2210. The following examples are noted:
 "Claimant threatens to seek attorney? N/A" may be classified as a noise sentence
 "Clmt threatens to seek atty" may be classified as an affirmative sentence;
 "Claimant threatens to seek attorney? No" may be classified as a negation sentence;
 "If Clmt threatens to seek attorney, settle fast" may be classified as a conditional sentence;
 "Clmt upset, may seek attorney" may be classified as a tentative sentence.

In step 1908, each sentence is further tagged with domain relevant categories based on the various aspects of the text. For example, in the context of insurance claim notes, a sentence may be tagged with the line of business (e.g. "Auto", "Homeowners") and coverage (e.g. "Bodily Injury", "Property Damage"), etc. applicable to the claim note.

In step 1910, the classified and tagged sentences are fed to a powerful text search engine (e.g. Apache Solr, Elastic Search, etc.) which performs transforms such as stemming, lemmatization, etc. on the text and supports fuzzy searches. This can be performed on text search database 2212.

In step 1912, process 1900 builds an ontology with a list of hashtags and the applicability of the hashtag to the various categories. For example:

SoftTissueInjury=> {LOBs: ("Auto", "General Liability"), Coverages: ("Bodily Injury", "Slip and Fall", . . . ), . . . }.

In step 1914, process 1900 builds a multitude of mini-dictionaries are built and linked to the categories based on relevance. Mini-dictionaries can be included in the ontology graph database 2202. These mini-dictionaries can further be auto-learnt from the categorized sentences, using techniques (e.g. word2vec, Glove, etc.). Examples are now provided as, inter alia:

{LOB: "Auto", Coverage: "Bodily Injury"}: strain=strain, sprain, twist;

{LOB: "Homeowners", Coverage: "Property Damage"}: strain=strain, fracture, crack;

{LOB: "Auto", Coverage: "Emotional Injury"}: strain=strain, tiredness.

In step 1916, each hashtag is linked to a set of seed query phrases along with the sentence type they apply to. Examples are now provided as, inter alia:

SoftTissueInjury:

{Affirmative Sentence}=> "soft tissue injury", "strain", "neck pain";

{Negation Sentence}=> "not serious injury".

In step 1918, process 1900 links each hashtag to a set of seed query phrases that negate the hashtag. Examples are now provided as, inter alia:

SoftTissueInjury:

NOT {Accusatory Sentence}=> "pain in the neck"

In step 1920, process 1900 can, in some cases, link other types of queries such as REGEX queries, etc. to the hashtag. Examples are now provided as, inter alia:

SoftTissueInjury:

REGEX {Affirmative Sentence}=>/.*soft-tissue.*/

In step 1922, all of the above configurations and corresponding links are stored in an ontology graph database (e.g. a proprietary graph database and graph analytics software such as, inter alia: Neo4j®, TigerGraph®, SolrGraph®, etc.). This can be done for efficient access. The structure of the graph database provides an implicit rules hierarchy.

In step 1924, process 1900 builds a distributed multi-stage parallel-processing software pipeline that reads the above configuration and runs through a corpus of documents to identify sentences that match each hashtag. The hashtag operations can be performed by hashtag execution engine 2214. Module 2218 manages the operations on the sentences and short paragraphs with hashtags.

In step 1926, the taggings from above pipeline can then be presented to a domain expert for validation. This can be done by domain expert validation module 2216. The short paragraph each sentence belongs to may be presented for additional context. Machine learning based classifiers can now be built on top of the sentences/short paragraphs that are extracted in a focused manner for each hashtag in step 1928.

In production deployment, in step 1930, these classifiers are added as the final stage to the above processing pipeline to automatically tag a chunk of text (for e.g. claim notes) with a list of semantic hashtags, topics, and events; along with temporal information on when the hashtag/topic/event was detected in the document. The tagged documents can be further used for trends analysis, patterns determination, predictive modeling, workflows, and other use cases.

Process 1900 can provide increased processing speed with the pipeline-based accuracy. Process 1900 can provide more focused training and model tuning for each hashtag, in a much easier manner. Process 1900 can provide increased accuracy in identifying topics, events, etc. due to domain noise reduction, sentence intent understanding and text snippet category aware tagging.

Figure 21:
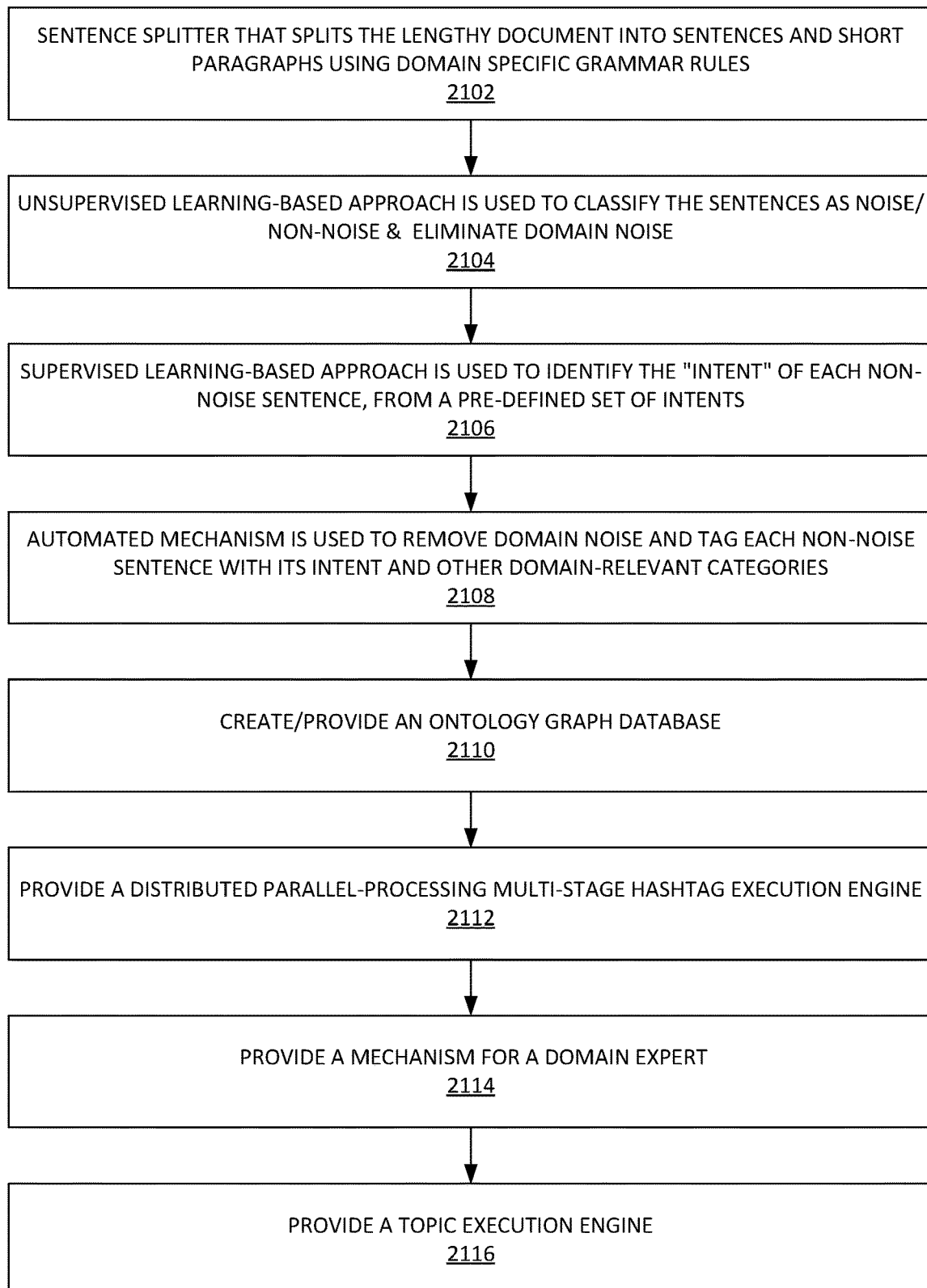
FIG. 21 illustrate another example process for implementing a computerized natural language processing with insights extraction using semantic search, according to some embodiments.

FIG. 21 illustrate another example process 2100 for implementing a computerized natural language processing with insights extraction using semantic search, according to some embodiments. In step 2102, a sentence splitter that splits the lengthy document into sentences and short paragraphs using domain specific grammar rules.

In step 2104, an unsupervised learning-based approach is used to classify the sentences as noise/non-noise and eliminate domain noise.

In step 2106, a supervised learning-based approach is used to identify the "intent" of each non-noise sentence, from a pre-defined set of intents.

In step 2108, an automated mechanism is used to remove domain noise and tag each non-noise sentence with its intent and other domain-relevant categories.

In step 2110, process 2100 creates/provides an ontology graph database which comprises of sentence classes (intents), domain-relevant categories, multitude of mini-dictionaries, hashtags with applicable categories and various types of queries.

In step 2112, process 2100 provides/manages a distributed parallel-processing multi-stage hashtag execution engine that uses the ontology graph database to automatically tag each sentence with one or more domain-relevant semantic hashtags.

In step 2114, process 2100 provides a mechanism for a domain expert to label and train semantic topic classifiers based on the hashtags.

In step 2116, process 2100 provides a topic execution engine that further classifies the hashtags to semantic topics and tags each original document in the corpus with a list of semantic temporal topics, that can be further used in trends analysis, patterns detection, predictive modeling, workflows, and other use cases.

Figure 22:
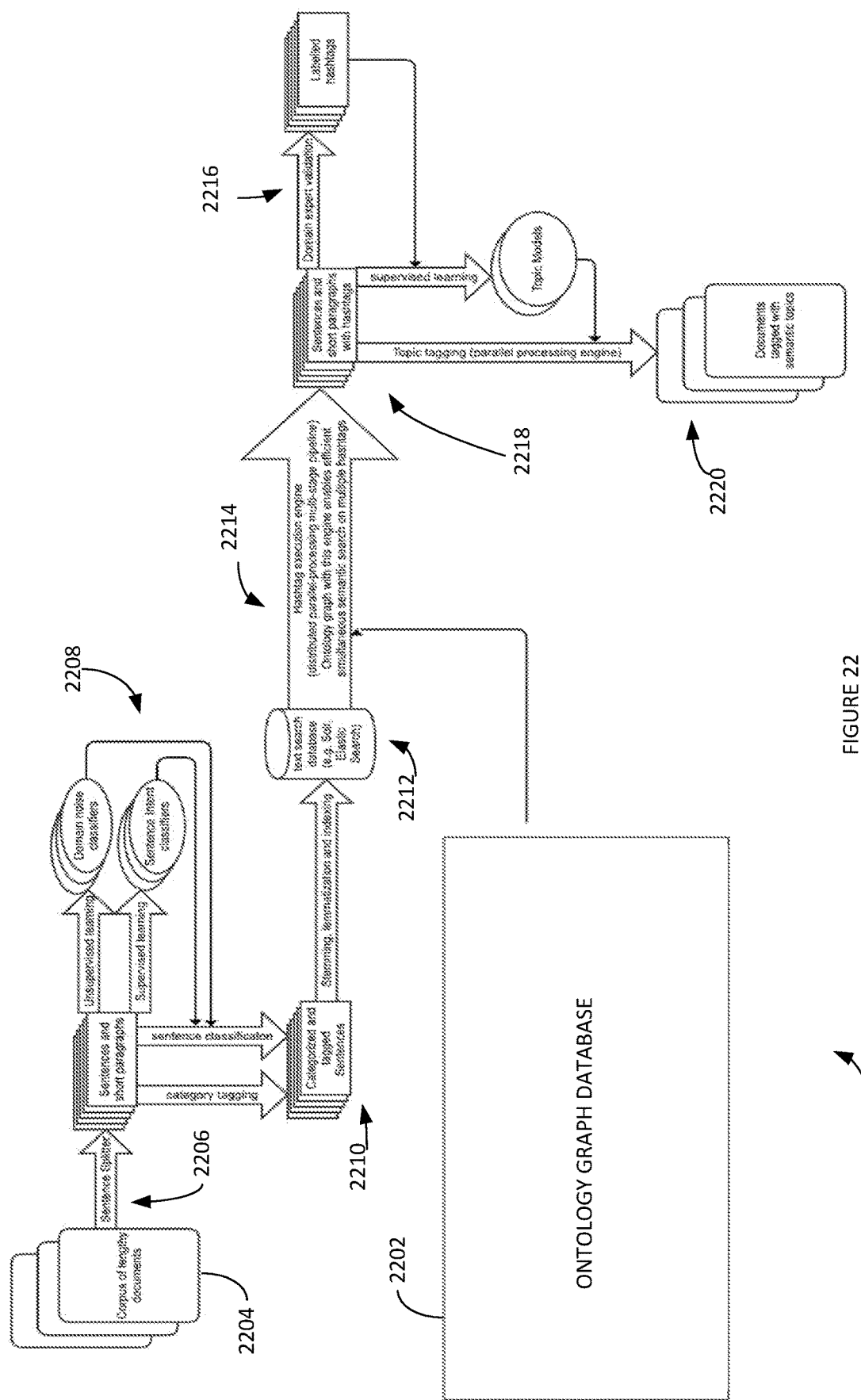
FIG. 22 illustrates an example system for implementing a computerized natural language processing with insights extraction using semantic search, according to some embodiments.

FIG. 22 illustrates an example system 2200 for implementing a computerized natural language processing with insights extraction using semantic search, according to some embodiments. System 2200 can be implemented in an apparatus and procedure to effectively extract hashtags representing semantic topics a corpus of documents, each having large chunks of text, wherein each semantic topic is critical towards an end goal, but may only be mentioned very briefly in each document. The description of system 2200 has been integrated into the discussion of process 1900 supra.

In one embodiment, corpus of lengthy documents 2204 can be operated upon by sentence splitter 2206 to create a set of sentences and short paragraphs. Machine learning process 2208 (e.g. unsupervised and supervised ML) can operate on the set of sentences and short paragraphs. For example unsupervised learning determines domain noise classifiers. Supervised learning determines sentence intent classifiers. These are provided to a sentence classification process that along with a category tagging process generates a set of categorize and tagged sentences 2210. Stemming, lemmatization and indexing operations are performed on the set of categorize and tagged sentences 2210 to generate text search database (e.g. Solr®, Elastic Search®, etc.) 2212. A hashtag execution engine 2214 (e.g. distributed parallel-processing multi-stage pipeline) and/or use of the ontology graph enables an efficient simultaneous semantic search on multiple hashtags to be performed. This can determine sentences and short paragraphs with hashtags 2218. Domain expert validation 2216 can be implemented on sentences and short paragraphs with hashtags 2218 to generate labelled hashtags to be utilized as part of another supervised learning process. The supervised learning process can generate various topic models. The topic models can be input (along with sentences and short paragraphs with hashtags 2218) into a topic tagging process (e.g. with a parallel processing engine) to generate documents tagged with semantic topics 2220.

Figure 23:
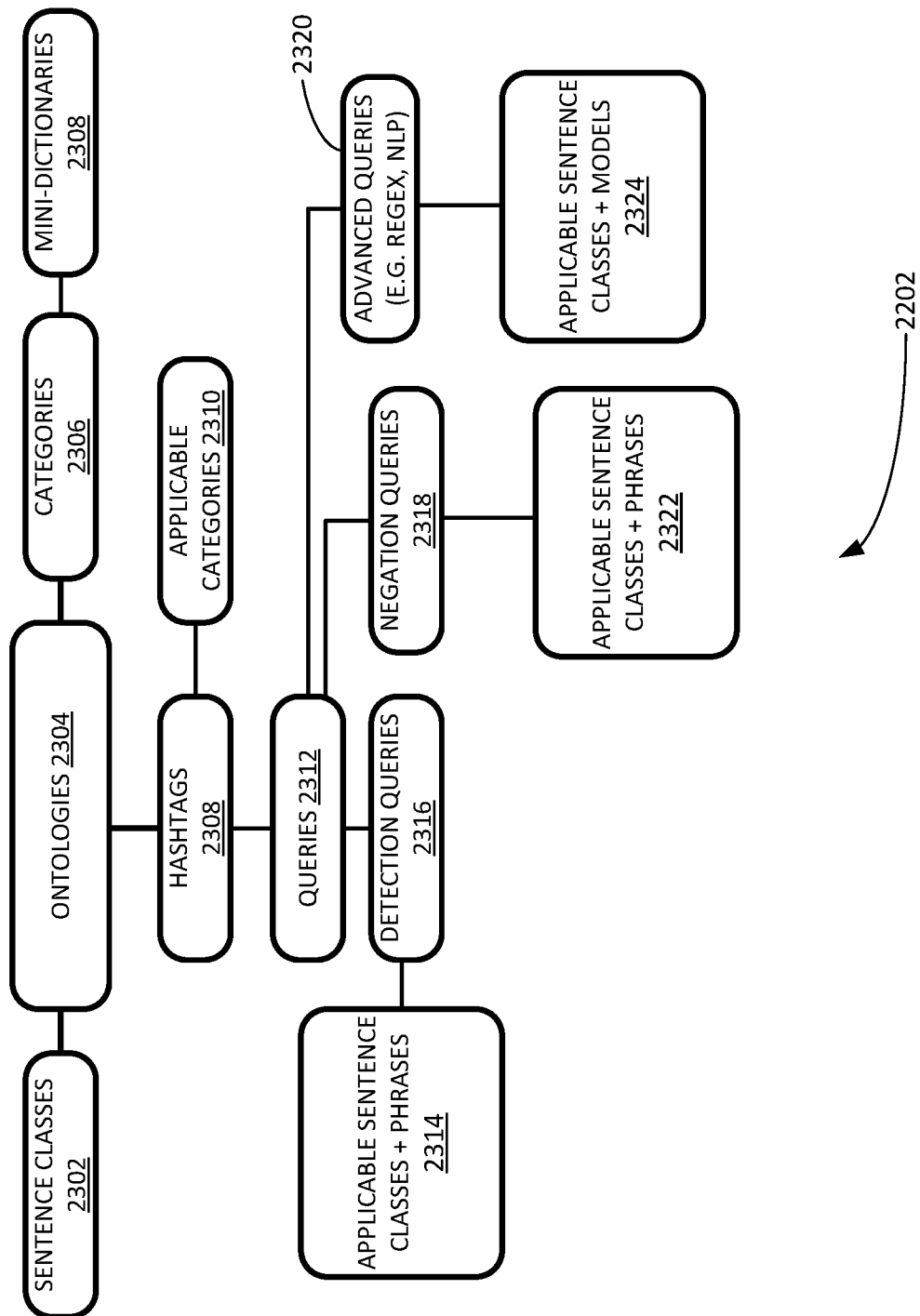
FIG. 23 illustrates an example ontology graph database, according to some embodiments.

FIG. 23 illustrates an example ontology graph database 2202, according to some embodiments. Ontology graph database 2202 includes, inter alia: ontologies 2304, categories 2306, mini-dictionaries 2308, hashtags 2308, applicable categories 2310, sentence classes 2302, queries 2312, negation queries 2318, advanced queries (e.g. regex, NLP) 2320 applicable sentence classes and phrases 2314, applicable sentence classes and phrases 2322, applicable sentence classes and models 2324, detection queries 2316, etc.

Additional Computer Architecture

Figure 24:
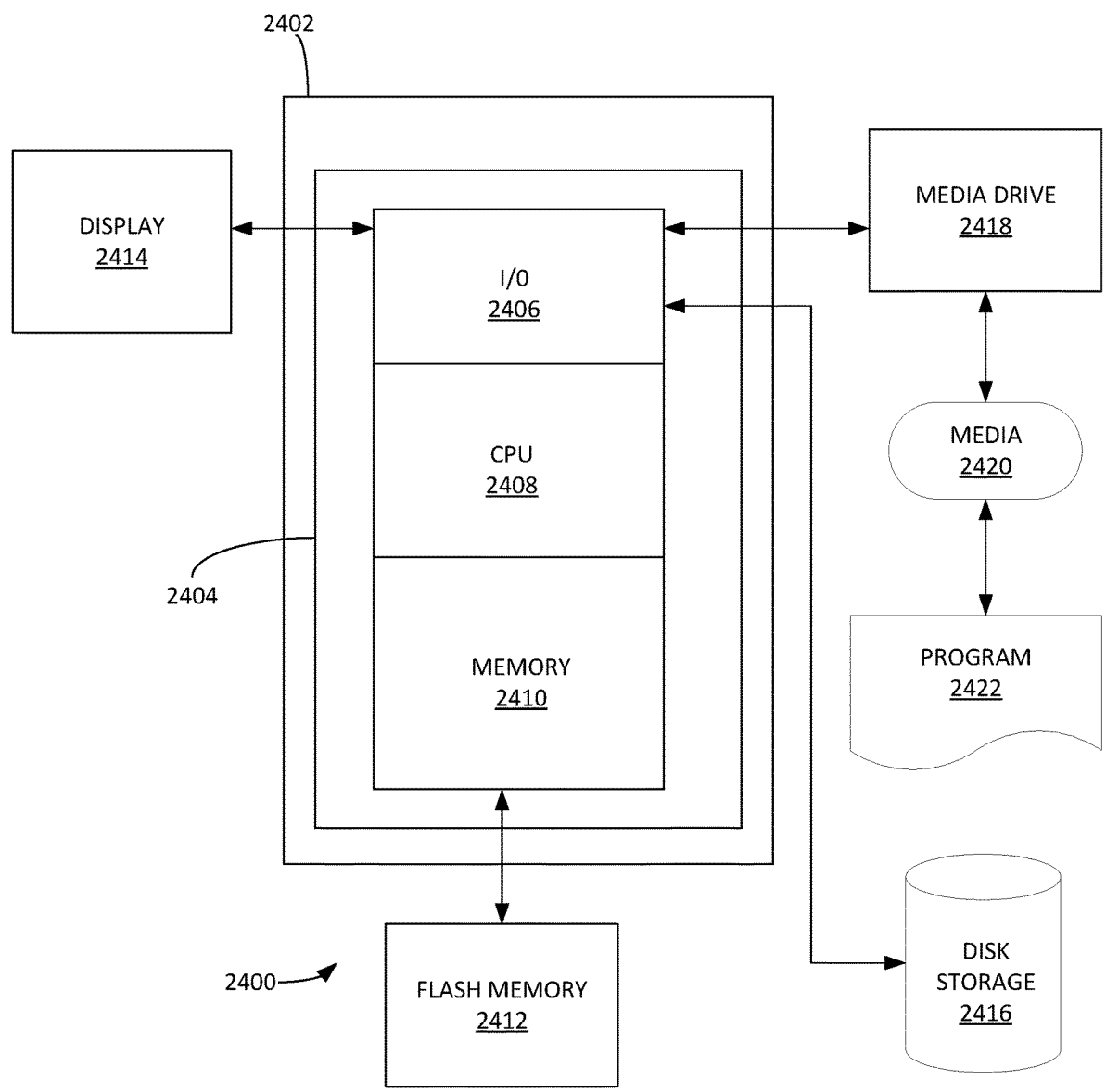
FIG. 24 depicts an exemplary computing system that can be configured to perform any one of the processes provided herein.

FIG. 24 depicts an exemplary computing system 2400 that can be configured to perform any one of the processes provided herein. In this context, computing system 2400 may include, for example, a processor, memory, storage, and I/O devices (e.g., monitor, keyboard, disk drive, Internet connection, etc.). However, computing system 2400 may include circuitry or other specialized hardware for carrying out some or all aspects of the processes. In some operational settings, computing system 2400 may be configured as a system that includes one or more units, each of which is configured to carry out some aspects of the processes either in software, hardware, or some combination thereof. System 2400 can be implemented in a cloud-computing platform as well FIG. 24 depicts computing system 2400 with a number of components that may be used to perform any of the processes described herein. The main system 2402 includes a motherboard 2404 having an I/O section 2406, one or more central processing units (CPU) 2408, and a memory section 2410, which may have a flash memory card 2412 related to it. The I/O section 2406 can be connected to a display 2414, a keyboard and/or other user input (not shown), a disk storage unit 2416, and a media drive unit 2418. The media drive unit 2418 can read/write a computer-readable medium 2420, which can contain programs 2422 and/or data. Computing system 2400 can include a web browser. Moreover, it is noted that computing system 2400 can be configured to include additional systems in order to fulfill various functionalities. Computing system 2400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A recommender system, comprising:
a plurality of processors; and
a non-transient, computer readable storage medium having encoded thereon machine instructions executable by one or more of the plurality of processors, wherein executing the machine instructions, comprises:
accessing an external database comprising unstructured and structured data related to a topic of interest, wherein the unstructured data comprise a plurality of documents,
semantically interpreting the unstructured data, comprising:
applying a natural language processing routine to identify an intent of the unstructured data;
using the identified intent, deriving context of the unstructured data;
using the identified intent and the context, generating recommendations for refining the unstructured data, comprising:
extracting a plurality of text objects from one or more of the documents, wherein the extracted text objects comprise a string of tokens,
generating a embedding reach of one or more of the tokens,
applying the embeddings to an object database, comprising:
executing a similarity routine to identify one or more discrete objects in the object database most similar to the embedding; and
collecting the one or more most similar objects for application to a large language model, and
applying the one or more most similar objects to the large language model to generate a recommendation; and
formatting the recommendations for display through a human user interface.

2. The recommender system of claim 1, wherein the object database is selected from a database group consisting of a vector database, a vector time-series database, a graph database, and an inverted-index database, and wherein the similarity routine is selected from a routine group consisting of vector quantization, stop-word filtering, synonym filtering, and n-gram filtering.

3. The recommender system of claim 1, further comprising:
applying a persona to the large language model; and
selecting a set of instructions to be followed by the large language model, and a set of conditions and limitations imposed on the large language model,
wherein the large language model uses the one or more most similar objects as an index to the external database, wherein the large language model retrieves documents from the unstructured data, as indicated by the index, for use in generating the recommendation.

4. The recommender system of claim 3, wherein the persona is an assumed persona.

5. The recommender system of claim 3, wherein the persona is determined based on the identified intent.

6. The recommender system of claim 5, wherein the processor applies identified intents to learn nuances of various personas and similarities and differences among the personas.

7. The recommender system of claim 6, wherein the various personas comprises an insurance claims examiner.

8. The recommender system of claim 1, wherein the processor implements reinforcement learning, comprising the processor:

receiving user-provided feedback signals related to one or more recommendations, through the interface;

determining patterns in the user-provided feedback signals; and adjusting the recommendations based on the patterns.

9. The recommender system of claim 8, wherein the processor implements unsupervised machine-learning, comprising learning new words and phrases, and new patterns.

10. The recommender system of claim 9, wherein the processor implements supervised machine learning, comprising refining words and phrases, implementing natural language processor (NLP) models, and providing patterns.

11. The recommender system of claim 1, further comprising an expert system, wherein the expert system is executed by the processor to:

configure rules, triggers, exceptions and answers for suggestions and alerts; search for words and phrases in unstructured data; and provide NLP-based semantic context detection in unstructured data.

* * * * *